United States Patent [19]

Tobias, II et al.

[11] Patent Number: 5,530,859

[45] Date of Patent: Jun. 25, 1996

[54] SYSTEM FOR SYNCHRONIZING A MIDI PRESENTATION WITH PRESENTATIONS GENERATED BY OTHER MULTIMEDIA STREAMS BY MEANS OF CLOCK OBJECTS

[75] Inventors: John C. Tobias, II, Sunnyvale; Matthew L. Denman, Los Gatos, both of Calif.

[73] Assignee: Taligent, Inc., Cupertino, Calif.

[21] Appl. No.: 60,150

[22] Filed: May 10, 1993

[51] Int. Cl.⁶ ...................................................... G06F 9/44
[52] U.S. Cl. ......................... 395/650; 395/154; 395/159; 395/62; 395/550; 395/155; 364/DIG. 1; 84/156
[58] Field of Search ................................... 395/159, 275, 395/550, 650, 154, 153, 155, 156; 84/156; 34/156

[56] References Cited

U.S. PATENT DOCUMENTS

| | | | |
|---|---|---|---|
| 4,566,362 | 1/1986 | Kikumoto | 84/1.03 |
| 4,692,757 | 9/1987 | Tsuhara | 340/721 |
| 4,694,724 | 9/1987 | Kikumoto et al. | 84/1.03 |
| 4,792,949 | 12/1988 | McCalley | 358/86 |
| 4,893,256 | 1/1990 | Rutherfoord | 364/518 |
| 4,972,462 | 11/1990 | Shibata | 379/89 |
| 5,027,400 | 6/1991 | Baji | 380/20 |
| 5,033,804 | 7/1991 | Faris | 312/208 |
| 5,170,252 | 12/1992 | Gear | 358/181 |
| 5,274,796 | 12/1993 | Conner | 395/550 |
| 5,275,082 | 1/1994 | Kestner-Clifton et al. | 84/477 |
| 5,276,816 | 1/1994 | Cavendish et al. | 395/275 |
| 5,286,908 | 2/1994 | Jungleib | 81/603 |
| 5,331,111 | 7/1994 | O'Connell | 84/602 |
| 5,333,299 | 7/1994 | Koval et al. | 395/550 |
| 5,345,550 | 9/1994 | Bloomfield | 395/156 |
| 5,382,891 | 1/1995 | Huffner | 318/269 |
| 5,388,264 | 2/1995 | Tobias, II et al. | 395/650 |
| 5,390,138 | 2/1995 | Milne et al. | 395/500 |
| 5,420,801 | 5/1995 | Dockter et al. | 364/514 |
| 5,421,236 | 6/1995 | Sanger | 84/484 |
| 5,425,140 | 6/1995 | Bloonfield | 395/156 |
| 5,487,167 | 1/1996 | Dinallo et al. | 395/650 |

FOREIGN PATENT DOCUMENTS 239884  10/1987  European Pat. Off. .

OTHER PUBLICATIONS

Computer Communications, V. 15(10), Dec. 1992, Guilford GB, pp. 611–618 G. Blakowski et al., "Tool Support for the Synchronization and Presentation of Distributed Multimedia".

Computer Journal, V. 36(1), Oct. 1992, London GB, pp. 4–18, F. Horn et al. "On Programming and Supporting Multimedia Object Synchronization".

*Primary Examiner*—Christopher B. Shin
*Attorney, Agent, or Firm*—Keith Stephens

[57] ABSTRACT

A method and system for providing synchronization of the timing of various multimedia events, including MIDI data events. Clock objects are defined in the storage and associated with an internal or external source of current time. The clock objects are able to be displayed on the display, but can be hidden once their linkages are defined. One or more multimedia objects representative of audio, visual or other multimedia events, including a MIDI data object, are defined and linked to a particular clock object or clock objects. Then, a processor synchronizes the multimedia objects, including a MIDI data object, with the associated clock object or objects. Finally, the various multimedia events are performed in synchronization with their associated clocks. The multimedia objects, including the MIDI data, may include external multimedia sources managed by the computer system.

16 Claims, 26 Drawing Sheets

A CLOCK WHOSE CURRENT TIME IS 1,000,000 PICOSECONDS.

SYSTEM TIMER

SMPTE TIME CODE $t_B = 2t_A + 500,000$

SYSTEM FOR SYNCHRONIZING A MIDI PRESENTATION WITH PRESENTATIONS GENERATED BY OTHER MULTIMEDIA STREAMS BY MEANS OF CLOCK OBJECTS

CROSS-REFERENCE TO RELATED PATENT APPLICATIONS

This patent application is related to the patent application Ser. No. 07/996,172, entitled Object Oriented Framework System, by Debra L. Orton, David B. Goldsmith, Christopher P. Moeller, and Andrew G. Heninger, filed Dec. 23, 1992, abandoned, and assigned to Taligent, the disclosure of which is hereby incorporated by reference.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention generally relates to improvements in computer systems and more particularly to a system for synchronizing the timing of various Musical Instrument Digital Interface (MIDI) events.

BACKGROUND OF THE INVENTION

Multimedia is perhaps the fastest growing application for computer systems. Increasingly, users are employing computers to present graphic, sound and imaging information to end users. Users are increasingly demanding ergonomic interfaces for managing multimedia presentations. In the past, the system clock was often used to commence a sound playback at a certain time, or present information on a computer display at a specific time. However, tools for synchronizing the presentation of music or sound with the display of information as a multimedia presentation unfolded was not possible.

Examples of current multimedia systems that do not have the synchronization capability of the subject invention are Apple's Quicktime and Microsoft's Video for Windows as described in the March issue of NEWMEDIA, "It's Showtime", pp. 36–42 (1993). The importance of obtaining a solution to the synchronization problem encountered in the prior art is discussed in the March issue of IEEE Spectrum, "Interactive Multimedia", pp. 22–31 (1993); and "The Technology Framework", IEEE Spectrum, pp. 32– 39 (1993). The articles point out the importance of multimedia interoperability which is only effectively presented with the synchronization capability of the subject invention. In particular, Musical Instrument Digital Interface (MIDI) data must be properly synchronized with other multimedia events to create an aesthetic presentation.

SUMMARY OF THE INVENTION

Accordingly, it is a primary objective of the present invention to provide a system and method for synchronizing various multimedia events, including MIDI data, throughout the course of a multimedia presentation using a computer with a storage and a display. Clock objects are defined in the storage and associated with an internal or external source of current time. The clock objects are able to be displayed on the display, but can be hidden once their linkages are defined. One or more multimedia objects representative of audio, visual, MIDI or other multimedia events are defined and linked to a particular clock object or clock objects. Then, a processor synchronizes the multimedia objects with the associated clock object or objects. The multimedia objects, including the MIDI data, may include external multimedia sources managed by the computer system.

DETAILED DESCRIPTION OF THE INVENTION

Figure 1:
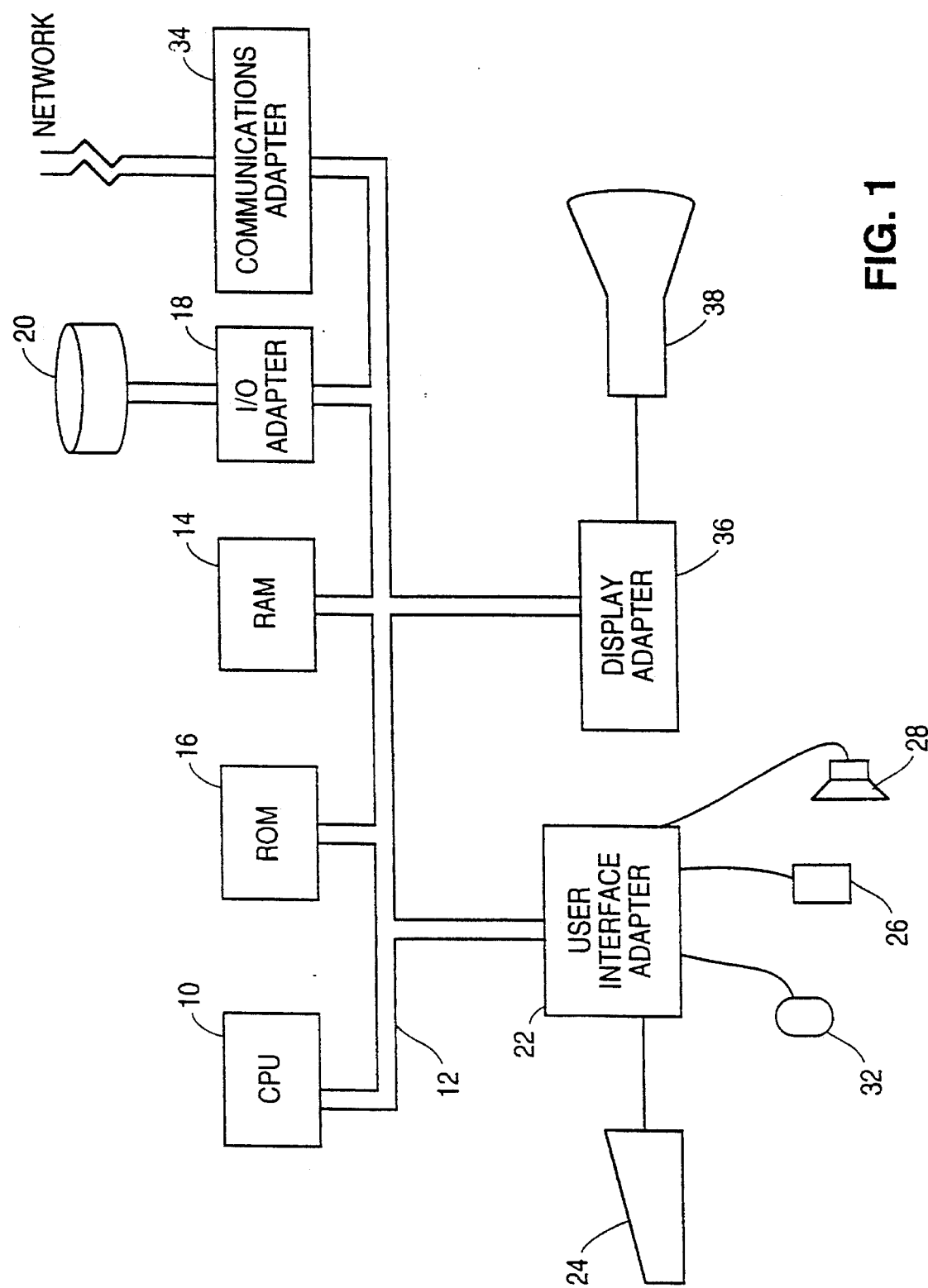
FIG. 1 is a block diagram of a personal computer system in accordance with a preferred embodiment.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7® operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, *Reusing Object-Oriented Designs*, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions as in our example earlier. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations who have acquired expertise in vertical markets such as manufacturing, accounting, or bio-technology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on what level of the system you are concerned with and what kind of problem you are trying to solve. The types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NEXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls-the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using systems framework would be to have separate I/O frameworks for SCSI devices, NuBus cards, and graphics devices. Because there is inherited functionality, each framework provides support for common functionality found in its device category. Other developers could then depend on these consistent interfaces to all kinds of devices.

A preferred embodiment takes the concept of frameworks and applies it throughout the entire system. For the commercial or corporate developer, systems integrator, or OEM, this means all the advantages that have been illustrated for a framework such as MacApp can be leveraged not only at the application level for such things as text and user interfaces, but also at the system level, for services such as graphics, multimedia, file systems, I/O, testing, etc.

Application creation in the architecture of a preferred embodiment will essentially be like writing domain-specific puzzle pieces that adhere to the framework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new.

In a preferred embodiment, as shown in FIG. 1, software clocks are responsible for providing the timebase, while multiple media players resident in the RAM 14, and under the control of the CPU 10, or externally attached via the bus 12 or communications adapter 34, are responsible for following the clock. No central player is necessary to coordinate or manage the overall processing of the system. This architecture provides flexibility and provides for increased extensibility as new media types are added. The following features are enabled by the innovative system and method of a preferred embodiment of the invention.

Players check with the clock as often as necessary to maintain synchronization to whatever level of precision the application demands.

Multiple clocks can be synchronized to each other, and linear time relationships between clocks can be used to specify offset and speed of sequences relative to each other.

Multiple time sources. Any clock (and hence any player) can be synchronized not only to the system clock but to external time sources (timecode from videotape, for example) or to user actions (such as moving a software shuttle knob, jog knob, or other controllers).

Clocks can travel backwards in time.

Clocks can span multiple address spaces.

Definition of Terms

What is a software clock?

Figure 2:
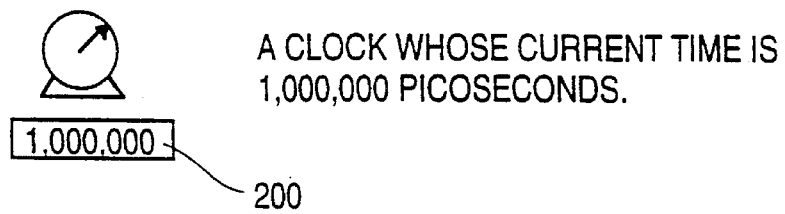
FIG. 2 is an illustration of a clock object in accordance with a preferred embodiment.
Figure 3:
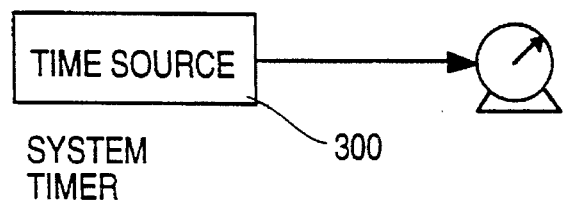
FIG. 3 is an illustration of a system timer in accordance with a preferred embodiment.
Figure 4:
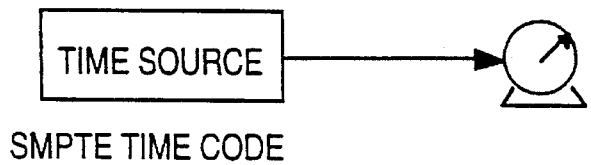
FIG. 4 is an illustration of an external source for time input to a clock object in accordance with a preferred embodiment.

A software clock, an illustration of which appears in FIG. 2, is an object that performs the following functions:

A clock has a current time, represented by a time object 200. A time object is a floating point number that measures a point in time, measured in picoseconds. Member functions are provided for setting and getting the current time. A member function is a function for acting upon an object. The current time can increase in value, in which case the clock is said to be going forward. The current time can also decrease in value, in which case the clock is said to be going backward.

delay: A clock can block a thread until a certain time, called the delay time, is reached. If the clock is going forward, the thread is unblocked when the clock's current time is equal to or greater than the delay time. If the clock is going backward, the thread is unblocked when the clock's current time is less than or equal to the delay time.

alarms: a clock can send an IPC (Interprocess Communication) message to a port when a certain time, called the a/arm time, is reached. If the clock is going forward, the IPC message is sent when the clock's current time is equal to or greater than the alarm time. If the clock is going backward, the IPC message is sent when the clock's current time is less than or equal to the alarm time.

multiple time sources: Normally, a clock's time advances in real-time based upon a system timer. The system timer is represented by a time source object 300 in FIG. 3. However, a clock can also be synchronized to another time source, such as Society of Motion Picture and Television Engineers (SMPTE) Time Code entering the computer from a video tape recorder (VTR) as illustrated in FIG. 4. The clock's current time will follow the timecode coming in from the VTR. As the VTR speeds up, the clock will speed up in lockstep. As the VTR slows down, the clock will slow down in lockstep. When the VTR goes backwards, the clock will go backwards in lockstep. The clock always remains synchronized with the VTR.

A time source has a current time, just like a clock. A linear function can be used to specify the relationship between the time source's current time and the clock's current time:

$t_{clock} = a \cdot t_{timesource} + b$; where:

$t_{clock}$ is the clock's current time $t_{timesource}$ is the time source's current time a is a floating point value that determines the rate of the clock's current time relative to the time source's current time.

b is a time object that determines the offset of the clock's current time relative to the time source's current time.

This function is called a clock function.

Synchronization: Clocks can also be synchronized to each other. Given two clocks, a master clock and a slave clock, a clock function can be specified, just as with a time source:

$t_{slave} = a \cdot t_{master} + b$; where:

$t_{slave}$ is the slave clock's current time $t_{master}$ is the master clock's current time a is a floating point value that determines the rate of the slave clock's current time relative to the master clock's current time.

b is a time object that determines the offset of the slave clock's current time relative to the master clock's current time.

Figure 5:
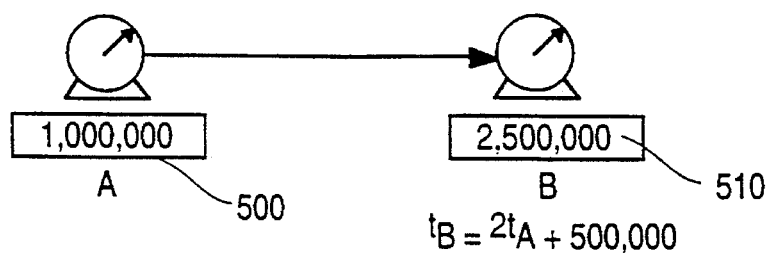
FIG. 5 is an illustration of a master clock object and a slave clock object in accordance with a preferred embodiment.
Figure 6:
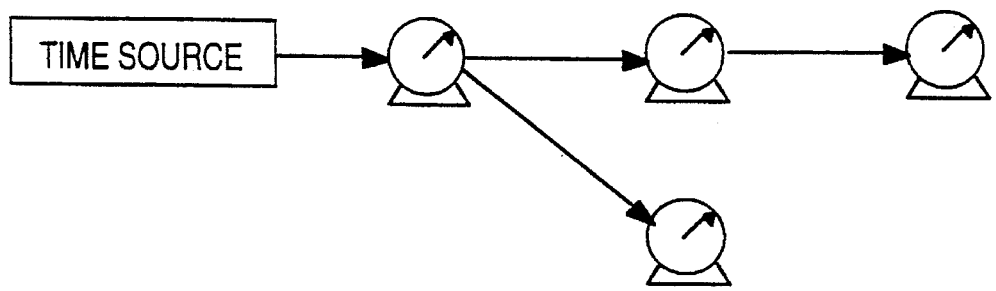
FIG. 6 is an illustration of a time source drawing a hierarchy of clock objects in accordance with a preferred embodiment.

For example, in FIG. 5, clock 510 (the slave) is synchronized to clock 500 (the master). A slave clock can also be a master to another clock. One clock can be master to any number of slave clocks. Because of these two rules, arbitrary tree structures of clocks can be created. FIG. 6 illustrates a time source driving a hierarchy of software clocks.

Two clock member functions are provided for synchronizing clocks together. They are called on the slave clock. One, called SyncTo(), allows the client to specify the master clock, the rate, and the offset. The second, SyncToKeepMyTime(), allows the client to specify the master clock and a rate, but calculates the offset such that the slave clock's current time does not change value at the instant of synchronization.

In addition, a member function SetRate() can be used to directly set the rate of a slave clock relative to its master.

Instances of Clock objects and time source objects in different address spaces can be synchronized together.

start & stop: A clock can be stopped, in which case its current time does not change, regardless of whether or not its master is changing. A stopped clock can be restarted, which causes the clock to continue to follow its master. The rate is unchanged. It remains the same as it was prior to the clock stopping. The offset is changed such that at the instant the clock is started, its current time is the same as when the clock was stopped.

set rate: The rate of a clock's function can be set to any floating point value. When the rate is changed, the offset is changed such that the clock's current time does not change.

What is a time-based media sequence?

Figure 7:
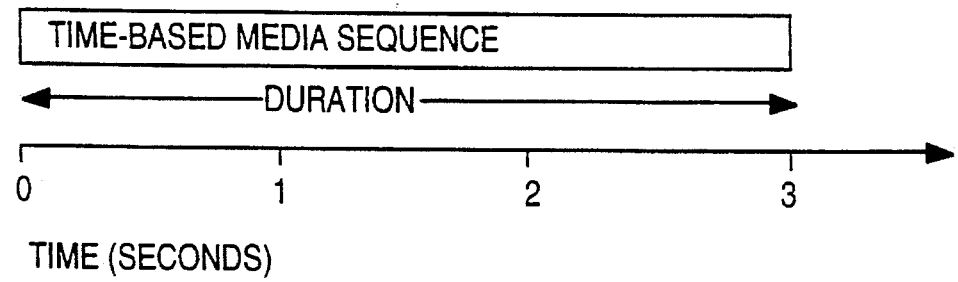
FIG. 7 is an illustration of a time based sequence in accordance with a preferred embodiment.

A time-based media sequence is an abstract base class that can be used to represent a clip of audio, video, animation, or Musical Instrument Digital Interface (MIDI) data, or any other data that varies over time. It starts at time 0 and has a duration represented by a time object. FIG. 7 is an example of a time based sequence that is three seconds in duration. Subclasses of the time-based media sequence are used to implement audio, video, animation, and MIDI sequences.

What is a time-based media player?

Figure 8:
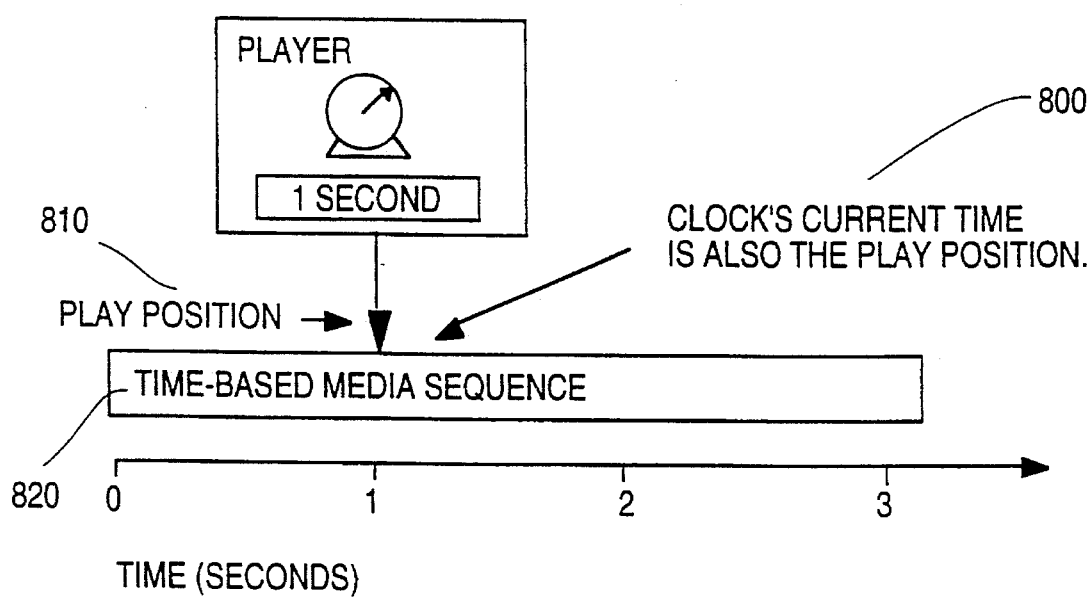
FIG. 8 is an illustration of a time-based media player in accordance with a preferred embodiment.

A time-based media player (hereafter referred to as a player) is an abstract base class that can be used to play or record a time-based media sequence. This class can be subclassed to create players for audio, video, and MIDI. FIG. 8 shows an example of a time-based media player. A player has an associated software clock object. The current time 800 of the software clock represents the playback position 810 of the player. Playback position 810 is analogous to a play head on a tape recorder. Ordinarily, a player's clock is synchronized to a default clock or time source such as the system timer. Such a player is said to be internally synchronized. However, the player's clock can also be synchronized to another time source or clock, including another player's clock. Such a player is said to be externally synchronized.

Figure 9:
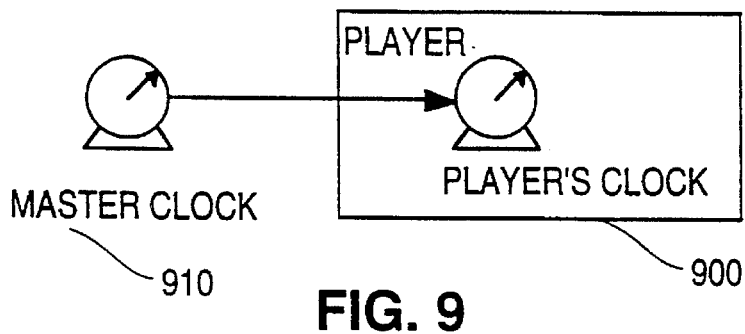
FIG. 9 is an illustration of a multimedia player that is externally synchronized to a master clock in accordance with a preferred embodiment.

In FIG. 9, the player 900 is externally synchronized to the master clock 910. The master clock 910 determines the play position of the player 900 according to its synchronization to the slave clock.

For Example: The player's clock is synchronized to the master clock such that:

$$t_{player} = 1 \cdot t_{master} + 0$$

If the master clock slows down, playback of the player slows down in lock step. If the master clock speeds up, the player speeds up. In all cases the player remains synchronized to the master.

When externally synchronized, it is the responsibility of the player to insure that its play position always reflects its clock's current time during playback. The same is true for recording.

Figure 10:
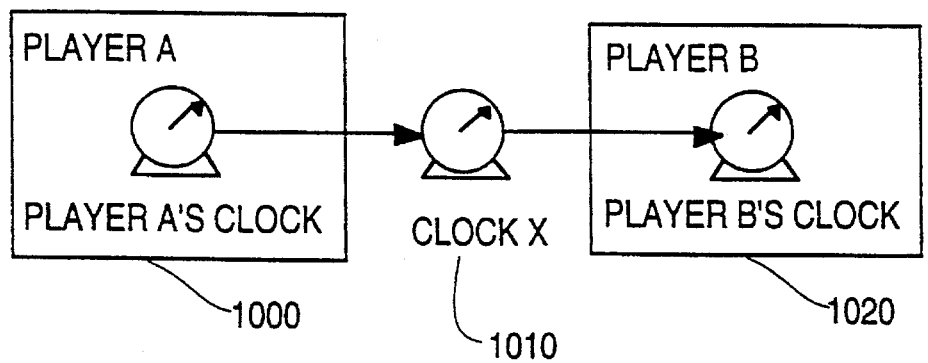
FIG. 10 is an illustration of a clock object that acts as a master to another clock object which in turn acts as a master to another clock object in accordance with a preferred embodiment.

A player's clock can also be used as a master clock to an external clock, which could in turn be a master to another clock. In FIG. 10, player A's clock 1000 acts as the master to the clock X 1010, which in turn acts as a master to player B's clock 1020. When player A 1000 is playing, both clock X 1010 and player B 1020 follow player A's clock. When the player A is stopped, its clock doesn't move and neither will clock X or player B's clock. It is the responsibility of a player, when internally synchronized, to insure that its clock's current position always reflects the play position.

SYNCHRONIZING TIME BASED MEDIA SEQUENCES

Master and Slave Players

Figure 11:
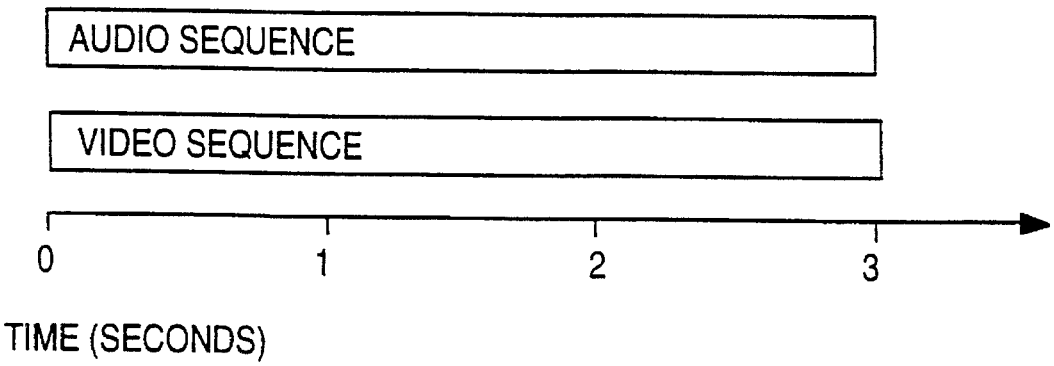
FIG. 11 is an illustration of an audio and video sequence synchronization in accordance with a preferred embodiment.
Figure 12:
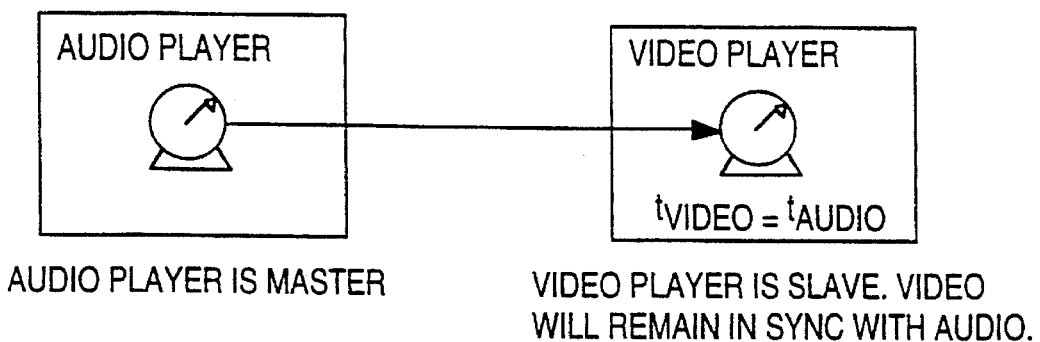
FIG. 12 is an illustration of an audio player (master), synchronized to a video player (slave) in accordance with a preferred embodiment.

To synchronize audio and video sequences together as illustrated in FIG. 11, the clocks of the two players would be synchronized together as shown in FIG. 12. The video player will always follow the audio player. If the audio player speeds up, the video player will speed up. If the audio player slows down, the video will slow down. If the audio stops, the video will stop. If the audio starts going backwards, the video will go backwards in lockstep. Any two time-based media players could be synchronized in this way, not just audio and video.

Synchronizing Players to a Common Clock

Figure 13:
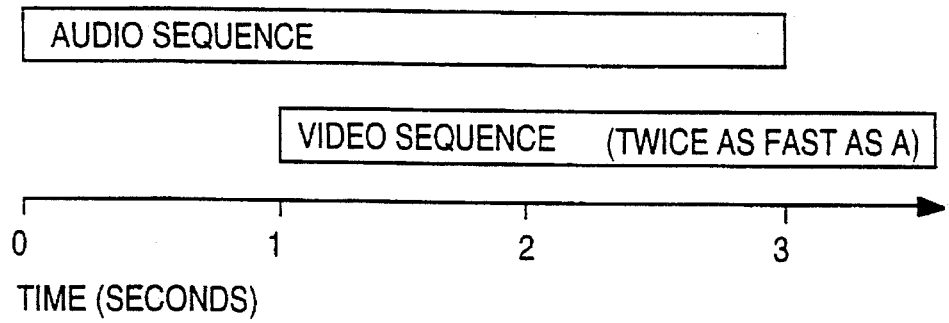
FIG. 13 is an illustration of an audio sequence in which the video sequence is synchronized to play twice as fast as the audio sequence in accordance with a preferred embodiment.
Figure 14:
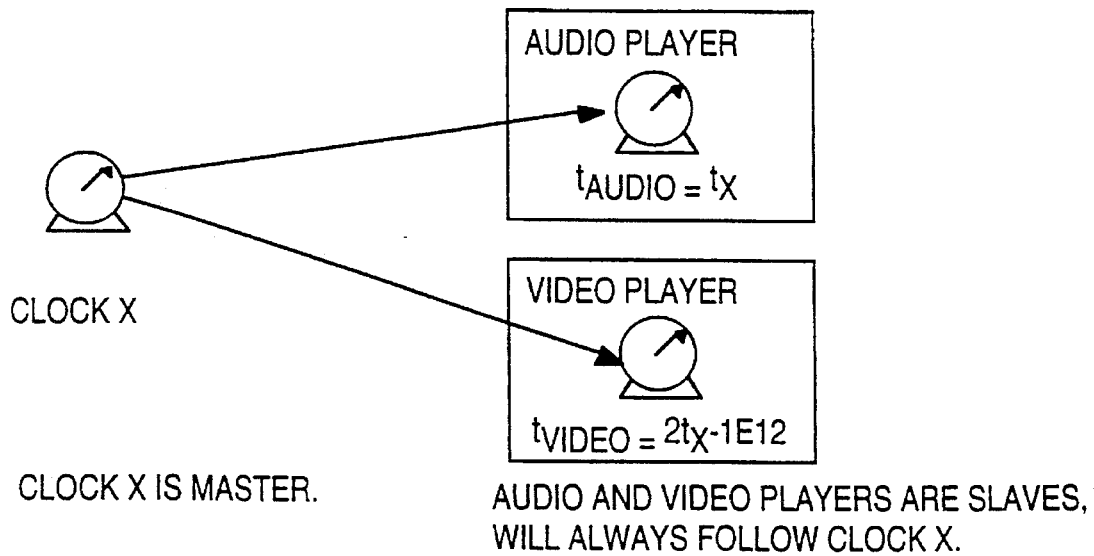
FIG. 14 is an illustration of a computer display in which a video sequence is synchronized to play twice as fast as the audio sequence in accordance with a preferred embodiment.

To start a video sequence one second after an audio sequence in which the video sequence plays twice as fast as the audio sequence, as shown in FIG. 13, two players must be created and their clocks must be synchronized to a single master clock as illustrated in FIG. 14. Any number of time-base media sequences can be synchronized to a single master clock.

Daisy Chaining Players

Figure 15:
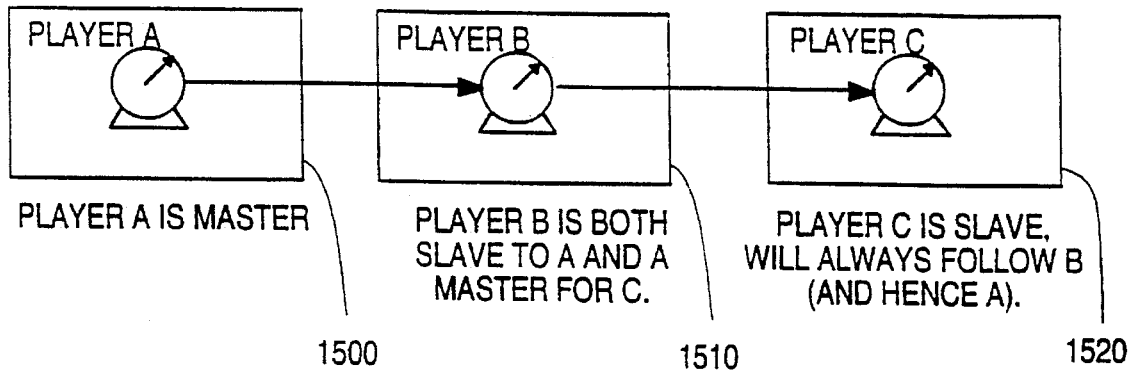
FIG. 15 is an illustration of a player object acting as a master and a slave in accordance, with a preferred embodiment.

It is possible for a player to be both a master and a slave as shown in FIG. 15. Such a player is externally synchronized, and therefore must behave like a slave. Acting like a master is accomplished at the same time with no extra effort. A slave 1520 can simply connect to the master/slave player's 1510 clock. A plurality of players can be daisy chained together.

Implementing a Software Jog/Shuttle Knob Rate Controller

Figure 16:
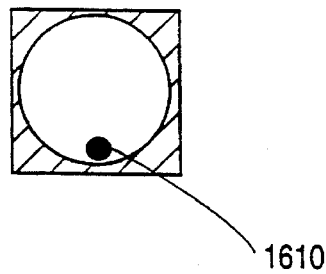
FIG. 16 is an illustration of a jog/shuttle knob in accordance with a preferred embodiment.

A Jog/Shuttle knob is a circular device that can be used to control the rate of playback of a collection of time-based media sequences. When in shuttle mode, the position of the knob controls the rate of playback. When in jog mode, the knob controls the play position. A software jog/shuttle knob can be implemented using a software clock. A pictorial representation of the jog/shuttle knob can be drawn on the computer screen, as shown in FIG. 16, and controlled with a mouse. When in jog mode, the position of the controller knob 1610 on the screen can be translated to a time position in the sequence. A time source is used to represent the time position. Every time the knob is set to a new position, the time source's current time is set to the corresponding time position in the sequence.

Figure 17A:
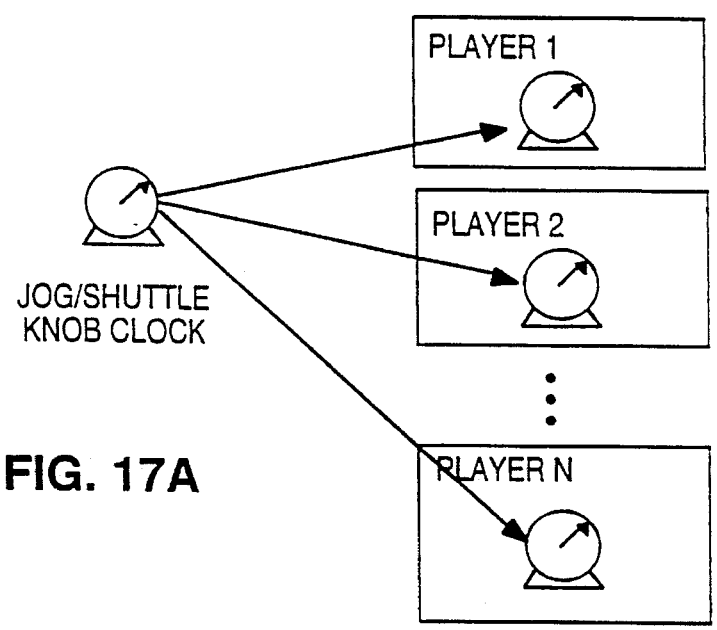
FIG. 17A is an illustration of a jog/shuttle knob object acting as a master over a plurality of multimedia objects in accordance with a preferred embodiment.

A clock object is slaved to the time source. Then, by synchronizing one or more players to the clock object, they will follow the position determined by the knob as illustrated in FIG. 17A. When in shuttle mode, the clock object is slaved to the system time source. The position to of the knob on the screen can be translated to a rate of playback. Each time the user changes the knob position on the screen the corresponding rate is set on the clock. Setting the rate of the clock will then cause all synchronized players to change their rates accordingly.

Figure 17B:
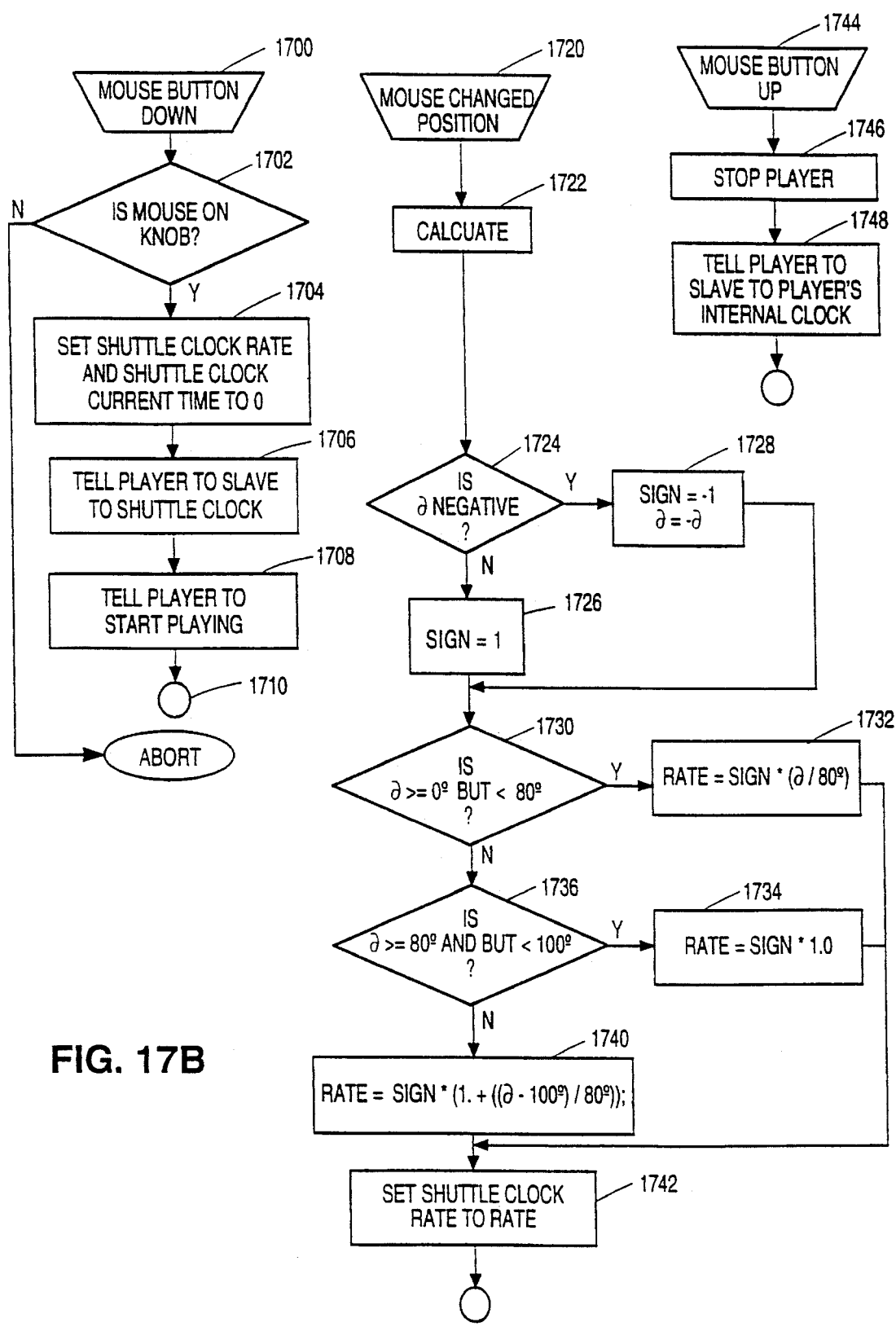
FIGS. 17B and 17C are flowcharts of a shuttle and jog knob in/accordance with a preferred embodiment.

FIG. 17B is a flowchart of the detailed logic associated with shuttle control operation in accordance with a preferred embodiment. When the mouse button is depressed as detected in function block 1700, a test is performed at decision block 1702 to determine if the mouse cursor is positioned over the knob on the shuttle controller as shown in FIG. 16 at 1610. If the cursor is so positioned, then at function block 1704 the shuttle clock rate is set to zero and the shuttle clock is set equal to a current time of zero. Then, at function block 1706, the player is slaved to the shuttle clock, the player is started at function block 1708, and processing is completed at terminal 1710.

When the mouse position changes as detected at function block 1720, the angle between the 12 o'clock noon and knob position is calculated in degrees at function block 1722 and a test is performed to determine if the angle is negative at decision block 1724. If so, then at function block 1728, the sign is set to −1, angle δ=−δ and control is passed to decision block 1730. If the test fails at function block 1726, then sign is set to 1. Then, at decision block 1730, a test is performed to determine if δ is >=0 degrees and <80 degrees, then rate is set equal to sign * δ/80 degrees and control is passed to function block 1742 to set the shuttle clock rate equal to rate. If not, then another test is performed at decision block 1736 to determine if δ is >=80 degrees and <100 degrees, then rate is set equal to sign * 1.0 and control is passed to function block 1742 to set the shuttle clock rate equal to rate. If not, then rate is set equal to sign * 1+(δ−100 degrees)/80 degrees and control is passed to function block 1742 to set the shuttle clock rate equal to rate.

When the mouse button is up at function block 1744, then the player is stopped at function block 1746 and the player is slaved to the player's internal clock at function block 1748.

Figure 17C:
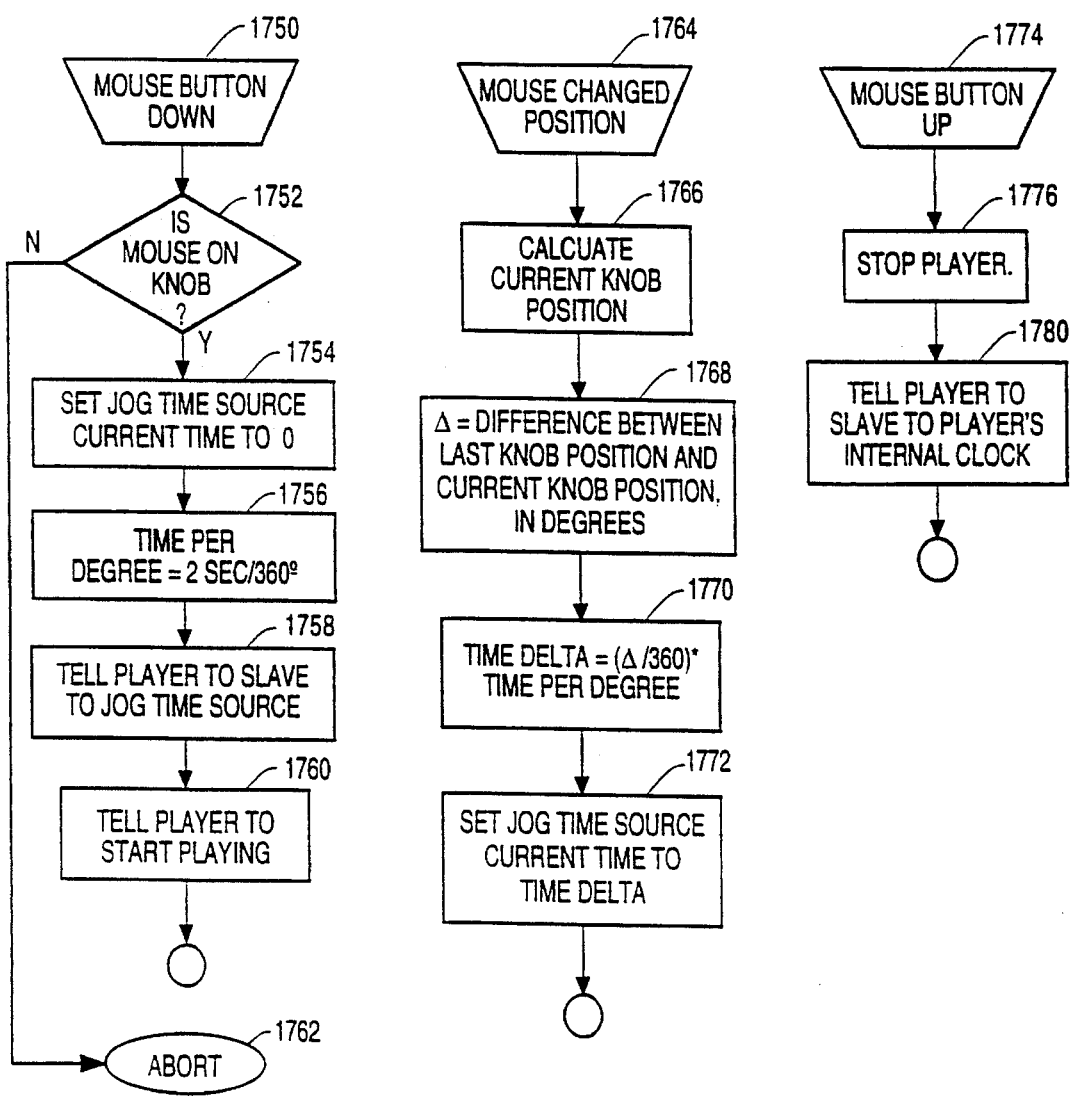

FIG. 17C is a flowchart of the detailed logic of the jog mode operation in accordance with the subject invention. If the mouse button is down as detected at function block 1750, then a test is performed at decision block 1752 to determine if the mouse cursor is on the knob. If not, then processing is aborted at terminal 1762. If the mouse is on a knob, then at function block 1754 the jog time source current time is set equal to zero, the last knob position is set equal to noon; the time per degree is set equal to 2 seconds/360 degrees at function block 1756, the player is slaved to the jog time source at function block 1758, and the player is started at function block 1760.

If the mouse button has changed position at function 1764, then the current knob position is calculated at function block 1766, the delta between the last knob position and the current knob position is calculated at function block 1768, the time delta is calculated at function block 1770, and the jog time source current time is set equal to the time delta in function block 1772.

When the mouse button is up at function block 1774, then at function block 1776, the player is stopped, and the player is set to slave the player's internal clock at function block 1780.

IMPLEMENTATION OF TIME SOURCES AND CLOCK OBJECTS

Time Source Implementation

Figure 18:
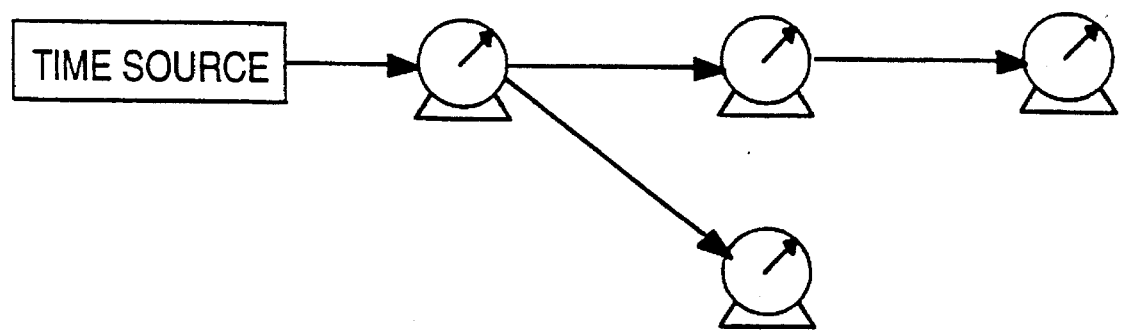
FIG. 18 is an illustration of a clock hierachy as it would appear on a computer display in a preferred embodiment.

A time source and the set of all clocks synchronized to it is called a clock hierarchy. FIG. 18 is an illustration of a clock hierarchy as it appears on a computer display in a preferred embodiment. The time source must be able to provide it's current time and implement alarms and delays. Alarms and delays are called wakeups. Sending an IPC message (an alarm) or unblocking a thread (a delay) is called firing a wakeup. The time source is responsible for firing any and all wakeups set on any clock in it's clock hierarchy.

For each clock in the clock hierarchy, the time source maintains a direct function that is used to convert from the time source's current time to the clock's current time. The direct function is of the form $$t_{clock} = a \cdot t_{timesource} + b; \text{ where}$$

$t_{clock}$ is the clock's current time $t_{timesource}$ is the time source's current time a is a floating point value that determines the rate of the clock's current time relative to the time source's current time.

b is a time object that determines the offset of the clock's current time relative to the time source's current time.

The inverse direct function is used to convert in the other direction—from a clock's current time to the time source's current time:

$$t_{timesource} = (t_{clock} - b)/a$$

Figure 19:
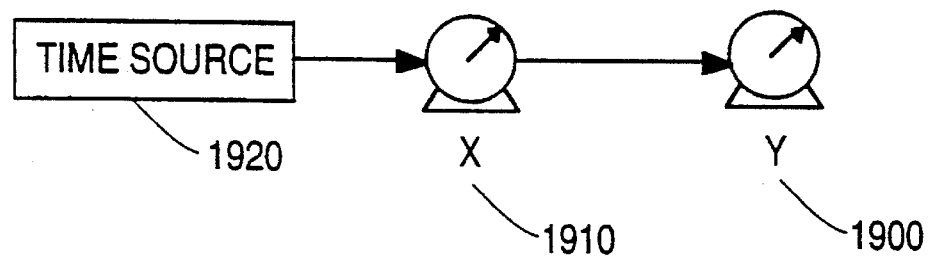
FIG. 19 is an illustration of a clock that is indirectly connected to a time source through another clock in accordance with a preferred embodiment.

When a clock is indirectly connected to a time source through one or more other clocks, the direct function can still be calculated by algebraic substitution. For example, consider clock Y 1900 in FIG. 19. Clock X 1910 is a function relative to the time source 1920 having the equation:

$$t_{clockx} = a_x \cdot t_{timesource} + b_x$$

Clock Y's 1900 function relative to Clock X 1910 is:

$$t_{clocky} = a_y \cdot t_{clockx} + by$$

Clock Y's 1900 direct function can be calculated by substitution:

$$t_{clocky} = a_y \cdot (a_x \cdot t_{timesource} + b_x) + b_y = (a_y \cdot a_x) \cdot t_{timesource} + (a_y \cdot b_x + b_y) = a \cdot t_{timesource} + b$$

where $a = a_y \cdot a_x$ $b = a_y \cdot b_x + by$

Setting the Current Time of a Time Source

Figure 20:
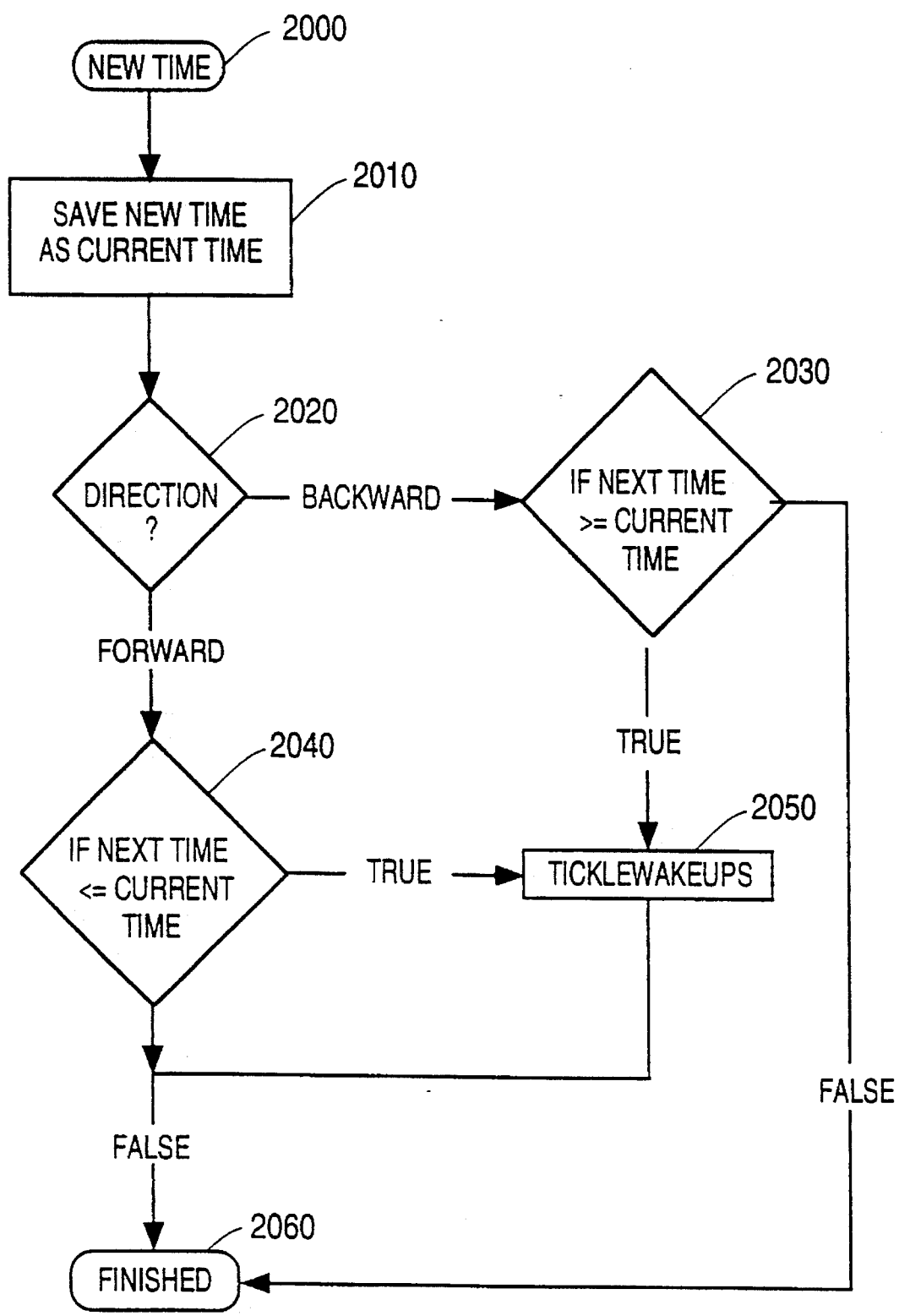
FIG. 20 is a detailed flowchart setting forth the logic of a SetTime function in accordance with a preferred embodiment.

There are two types of time sources, driven and non-driven. A driven time source is continually updated by a client setting it's current time. This is accomplished by calling the driven time source's SetTime() member function. The implementation of SetTime() is shown in the flowchart appearing in FIG. 20. Processing commences at terminal 2000 where the parameter "new time" is passed into Set-Time() at function block 2010 which saves the new current time.

The direction of the time source is determined by comparing "new time" to the time source's old current time at decision block 2020. If it is greater, the time source is going forward, and control is passed to decision block 2040. If it is smaller, then the time source is going backwards, and control is passed to decision block 2030. If equal, the direction of the time source remains unchanged. "Next time" is the time that the next wakeup needs to be fired. If the time source is going forward, a wakeup is late if "next time" is less than or equal to the current time. If the time source is going backward, a wakeup is late if "next time" is greater than or equal to the current time. The function block 2050 marked "ticklewakeups" fires all alarms and delays that are late. Firing wakeups is explained in more detail in the section below called *The Time Source's Wakeup List*. Processing is completed at terminal block 2060.

A non-driven time source does not need to be constantly be told what it's current time is. It is used for time sources such as the system timer where the underlying Operating System keeps track of the current time. A non-driven time source knows how to find its current time, and it has a member function, GetNextTime0, that returns the next time that an alarm or delay should be fired. GetNextTime() is called whenever a new alarm or delay is added to the time source. When a new alarm or delay needs to be fired, the time source's TickleWakeUps() member function can be called which will fire any wakeups that are late. This allows the implementor to create a time source that does not require constant SetTime() calls, as are required by a driven time source.

Getting the Current Time of a Time Source

A time source can get it's current time very quickly because in the case of a driven time source, it has the value stored in an internal data structure, or in the case of a non-driven time source, it can query the underlying operating system.

Handling Wakeups

Both kinds of wakeups—delays and alarms —are handled similarly by the time source. The time source gets a request from a clock for a wakeup to be fired at a certain time, called the wakeup time. The wakeup time is converted from the requesting clock's timebase to the time source's local timebase using an inverse direct function. The time source checks to see if the wakeup is late and needs to be fired. If the wakeup is late, the time source fires it, otherwise the time source adds the wakeup to a time-ordered list of wakeups, called the wakeup list.

The Time Source's Wakeup List

Whenever the wakeuplist changes because a wakeup has been removed or added, the time source's GetNextTime() method is called and it calculates the next time that a wake up needs to be fired. If the time source is a driven time source, its SetTime() member function calls TickleWakeups() whenever one or more wakeups are late. TickleWakeups() goes through the wakeuplist and fires all of the wakeups that are late. When a wakeup is fired it is also removed from the list. The GetNextTime() member function of a non-driven time source can be overridden to find out what time it next needs to call TickleWakeUps() and then set a timer to go off at that time. When the timer goes off, the time source calls TickleWakeups().

Figure 21:
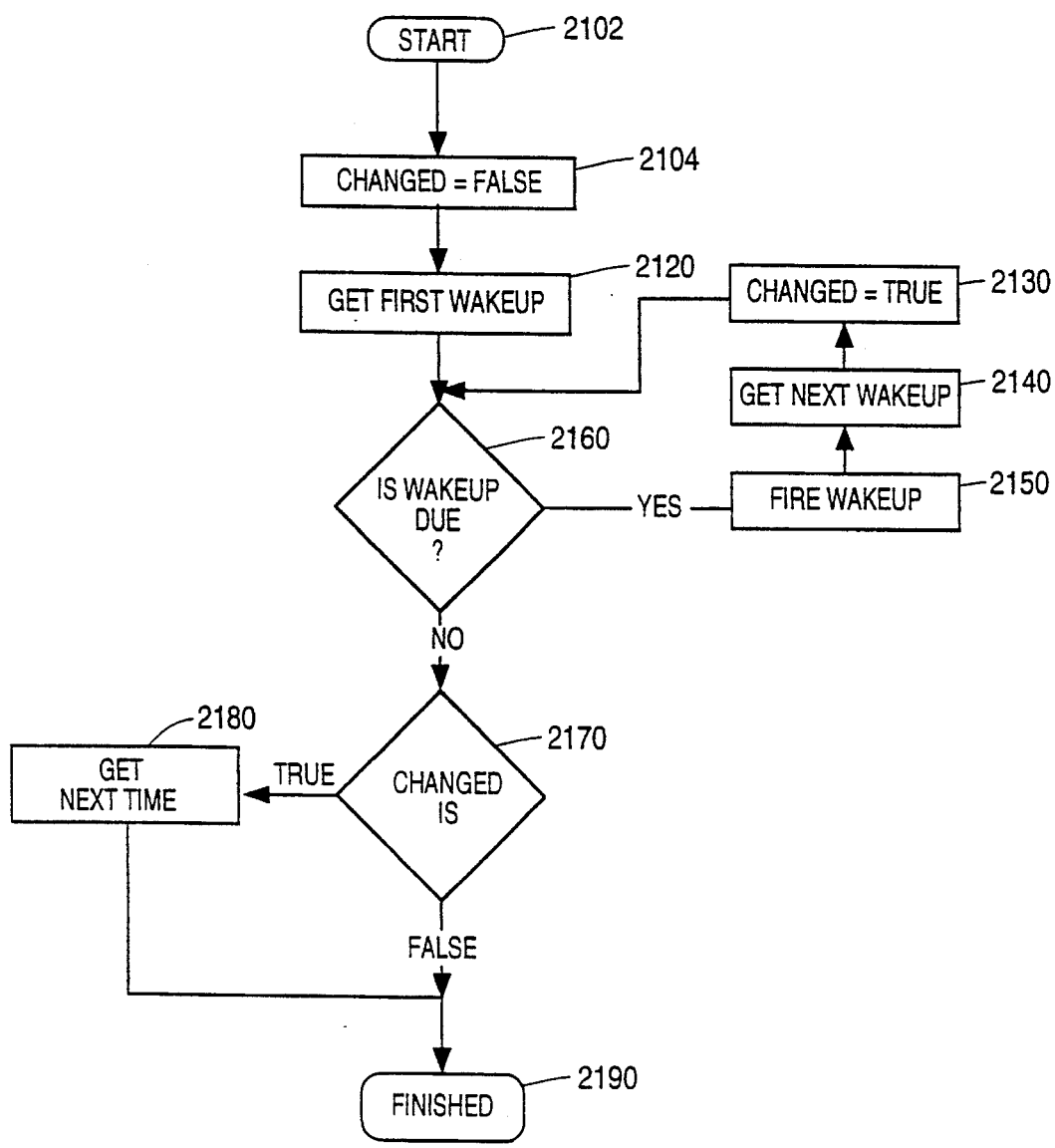
FIG. 21 is a detailed flowchart setting forth the logic of the TickleWakeups function in accordance with a preferred embodiment.

FIG. 21 sets forth the detailed logic of the TickleWakeups() function. Processing commences at terminal 2102 and immediately passes to function block 2104 where the variable changed is set equal to false. Then, at function block 2120, the first wakeup is obtained and a test is performed at decision block 2160 to determine if a wakeup is due. If a wakeup is due, then the wakeup is fired at function block 2150, the next wakeup is obtained at function block 2140, the variable changed is set equal to TRUE, and control is returned to decision block 2160 to await the next wakeup.

If a wakeup is not due at decision block 2160, then the variable changed is tested at decision block 2170. If the variable changed is TRUE, then get next time at function block 2180. If FALSE, then control is passed to terminal 2190 for finishing.

SOFTWARE CLOCK IMPLEMENTATION

Getting the Current Time of a Software Clock

Figure 22:
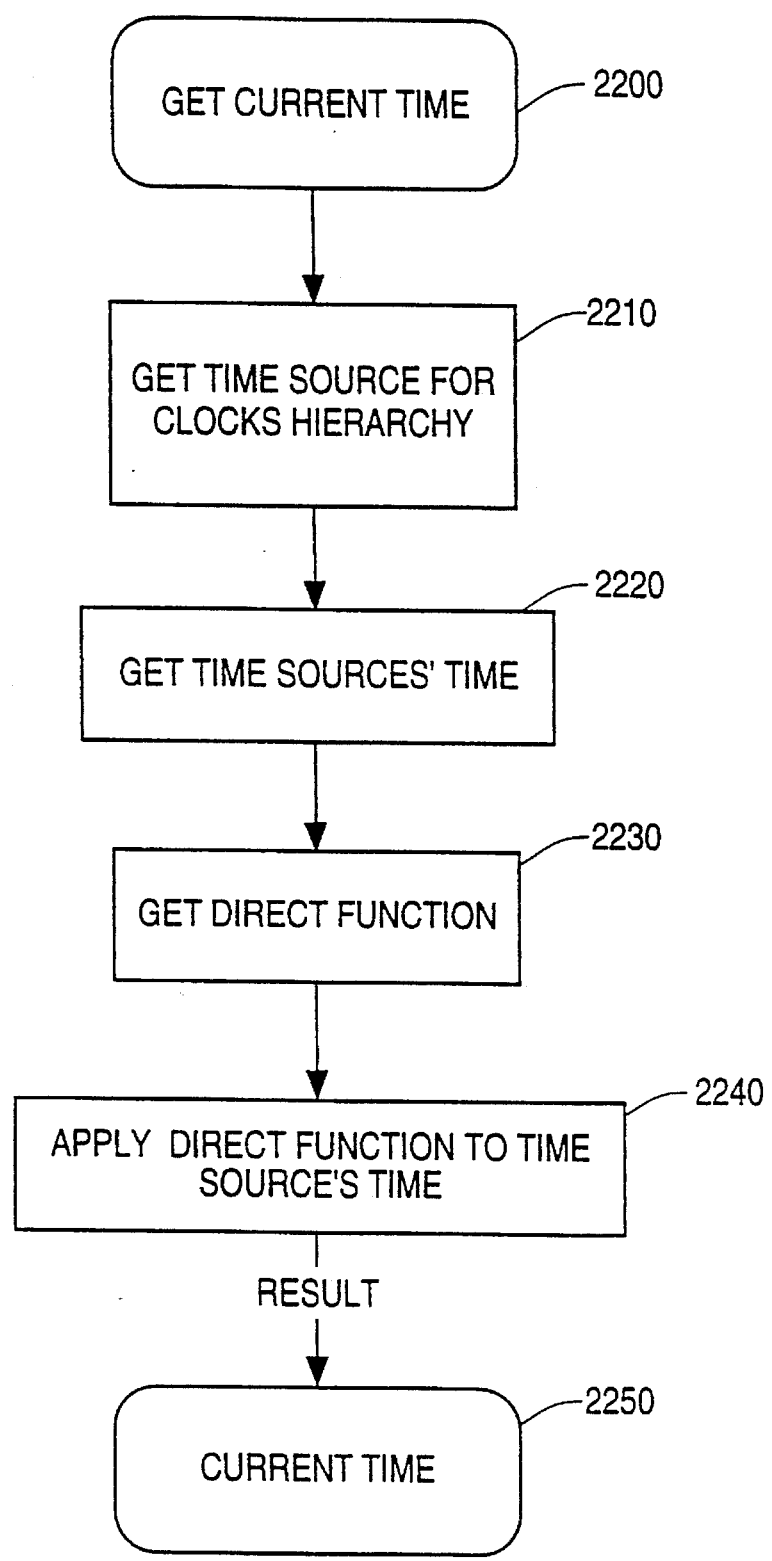
FIG. 22 is a detailed flowchart setting forth the logic of the Get Current Time operation in accordance with a preferred embodiment.

To get the current time for a clock, the clock procedure first obtains the current time from the time source for it's clock hierarchy. It then gets the direct function and converts the time source's current time to the clock's current time as detailed in the flowchart appearing in FIG. 22. Processing commences at 2200 and proceeds immediately to function block 2210 to get time source for the clock's hierarchy. Then, at function block 2220, the time source's time is obtained, and at function block 2230, the direct function is obtained. Finally, at function block 2240, the direct function is applied to the time source's time resulting in the current time returned at terminal 2250.

Because the clock and the time source may be in different address spaces, both the time source's current time and the clock's direct function are stored in memory shared between the two address spaces. A semaphore is used to insure that the direct function and time source's time don't change when they are being read from shared memory.

Setting a Delay on a Software Clock

There are two types of delays. One, a member function of a clock called DelayUntil(), will block the client's task until the clock's current time reaches a specified value. The second, a member function of a clock called DelayFor(), blocks the client's task until the a specified amount of time has elapsed. This second form of delay is actually identical to calling the first form, specifying a value equivalent the clock's current time plus the desired amount of elapsed time.

To delay on a clock, the clock sends the time it wants to delay until (or for) to the time source for it's clock hierarchy. The time source uses the inverse direct function for the clock to translate it to a time local to the time source (and adds the current time if it is a delay for and not delay until). The request is added to the wakeuplist (as already discussed in the *Handling Wakeups* section), and the caller is blocked until the wakeup is fired.

Setting an Alarm on a Software Clock

Figure 23:
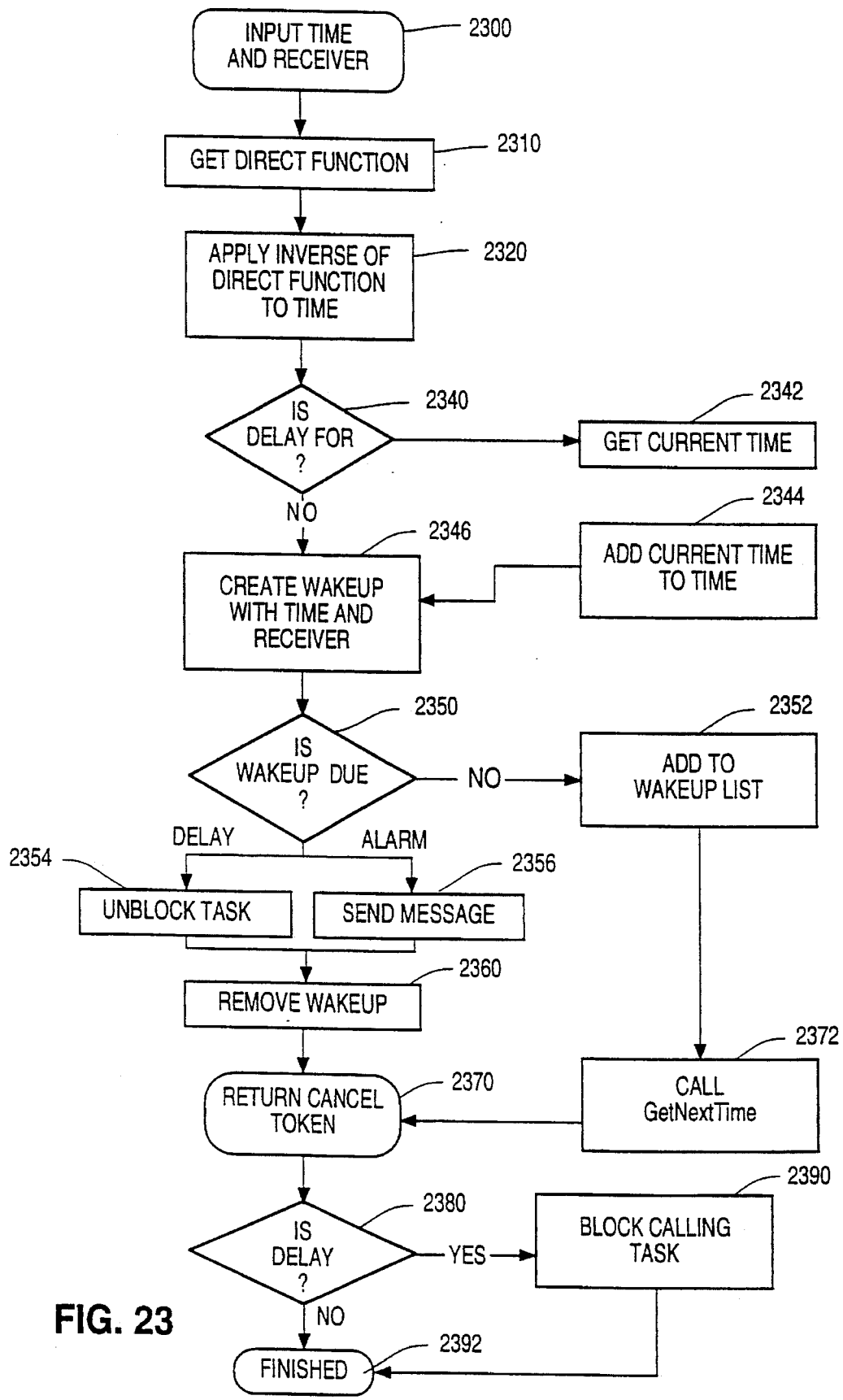
FIG. 23 is a detailed flowchart setting forth the logic of delay and alarm processing in accordance with a preferred embodiment.

Setting an alarm on a clock is the same as setting a delay on a clock except that the caller isn't blocked, a message is sent to a specified port instead. FIG. 23 is a flowchart showing how both delays and alarms are implemented. Processing commences at 2300 where the input time and receiver are input. Then, at function block 2310, the direct function is obtained, the inverse of the direct function is applied at function block 2320, and a test is performed at decision block 2340 to determine if the delay is a delay for. If so, then the current time is obtained at function block 2342, the current time is added to the time, and control passes to function block 2346.

If not a delay for, then at function block 2346 a wakeup is created with the time and receiver. Then, at decision block 2350, another test is performed to determine if wakeup is due. If not, then the wakeup is added to the wakeup list at function block 2352, get next time is executed at 2372, and control is passed back with a cancel token at terminal 2370. Processing is completed at terminal 2392. If a wakeup is due at decision block 2350, then if the wakeup is a delay, then the task is unblocked at function block 2354, the wakeup is removed at function block 2360, and processing is completed at terminal 2392. If the wakeup is an alarm, then a message is sent at function block 356, the wakeup is removed at function block 360, and processing is completed at terminal 392.

Synchronization of Clocks

Synchronization of clocks is implemented both in the software clock and the time source. Two software clock member functions are used by clients to synchronize clocks. Both are called on the slave clock in order to synchronize it to a master. One member function, called SyncTo(), allows the client to specify the master clock or time source, the rate, and the offset. The second, SyncToKeepMyTime(), allows the client to specify the master clock and a rate, but calculates the offset such that the slave clock's current time does not change value at the instant of synchronization.

SYNCTOKEEPMYTIME()

Figure 24A:
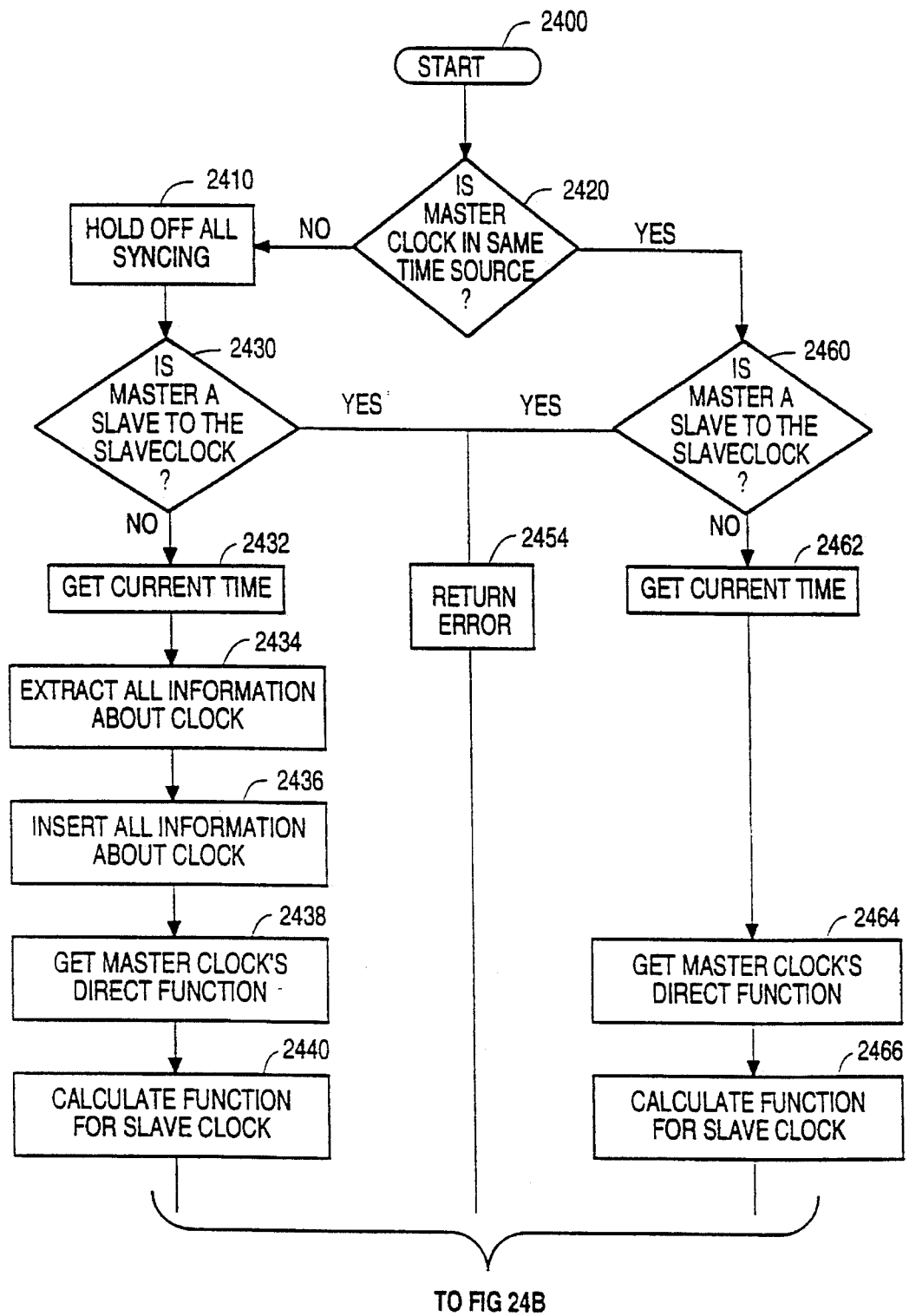
FIG. 24 is a detailed flowchart setting forth the logic of Sync To Keep My Time processing in accordance with a preferred embodiment.
Figure 24B:
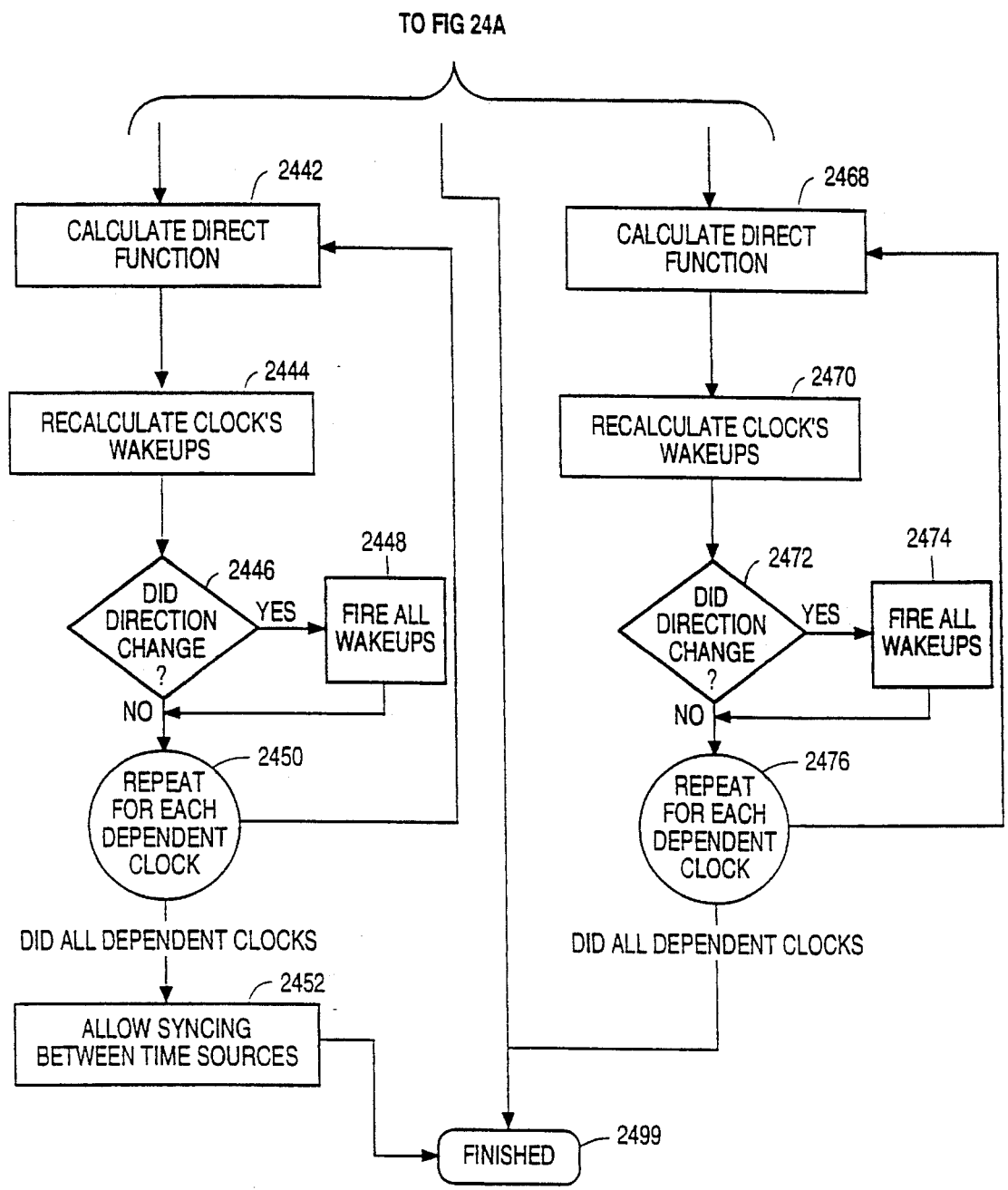

SyncToKeepMyTime() allows the client to specify the master clock and a rate, but calculates the offset such that the slave clock's current time does not change value at the instant of synchronization. FIG. 24 presents the detailed logic of SyncToKeepMyTime(). Processing commences at 2400 and immediately passes to decision block 2420 to determine if the master clock is in the same clock hierarchy. If not, then at function block 2410, all subsequent synchronization between time sources is placed on hold and a test is performed at decision block 2430 to determine if the master is currently a slave to the slave clock. If so, then an error is returned via function block 2454 and control is passed to terminal 2499.

If not, then at function block 2432 the current time is obtained for the slave clock, all information is extracted about the clock at function block 2434, the new master time source is updated at 2436, the master clock's direct function is obtained at function block 2438, the function is calculated for the slave clock based on the current time and supplied rate at function block 2440, the direct function is calculated based on master's direct function at function block 2442, clock wakeups are recalculated at 2444, and a test is performed at decision block 2446 to determine if a direction change has occurred. If so, then all wakeups are fired at function block 2448. If not, then processing is passed to 2450 to repeat the processing for each slave clock, and a function block 2452 synchronizing is provided between time sources before processing is completed at terminal 2499.

If the master clock is in the same time source in decision block 2420, then another test is performed at decision block 2460 to determine if the master is currently a slave to the slave clock. If not, then the current time is obtained for the slave clock at function block 2462, the master clock's direct function is obtained at function block 2464, the function is calculated for slave clock based on current time and supplied rate at function block 2466, the direct function is calculated at function block 2468, clock wakeups are recalculated at function block 2470, and a test is performed at decision block 2472 to determine if the direction has changed. If so, then all wakeups are fired at function block 2474. If not, then processing is repeated for all slave clocks at function block 2476 before processing is finished at terminal 2499.

The new clock function is calculated as follows:

Slave clock's function prior to synchronizing to master:

$$t_{slave}=a_{original} \cdot t_{master}+b_{original}$$

Slave clock's function after synchronizing to master with new rate $a_{new}$:

$$t_{slave}=a_{new} \cdot t_{master}+b_{new}$$

Where bnew is such that $t_{newslave}=t_{slave}$, i.e.

$$b_{new}=t_{master} \cdot (a_s-a_{new})+b_{original}$$

SYNCTO()

SyncTo(), allows the client to specify the master clock or time source, the rate, and the offset. Processing is very similar to the logic set forth in FIG. 24. The clocks new function is calculated as follows in the SyncTo() case:

Slave clock's function prior to synchronizing to master:

$$t_{slave}=a_{original} \cdot t_{master}+b_{original}$$

Slave clock's function after synchronizing to master with new rate $a_{new}$ and offset $b_{new}$:

$$t_{slave}=a_{new} \cdot t_{master}+b_{new}$$

A clock can synchronize to any other clock, even clocks in different clock hierarchies.

Audio player implementation

An audio sequence object comprises a segment of digitized sound samples. It has member functions to retrieve and store audio samples.

An audio player plays back an audio stream so that it can be heard over a speaker. It does this by periodically reading data from the audio stream and writing it to an audio output port.

Figure 25:
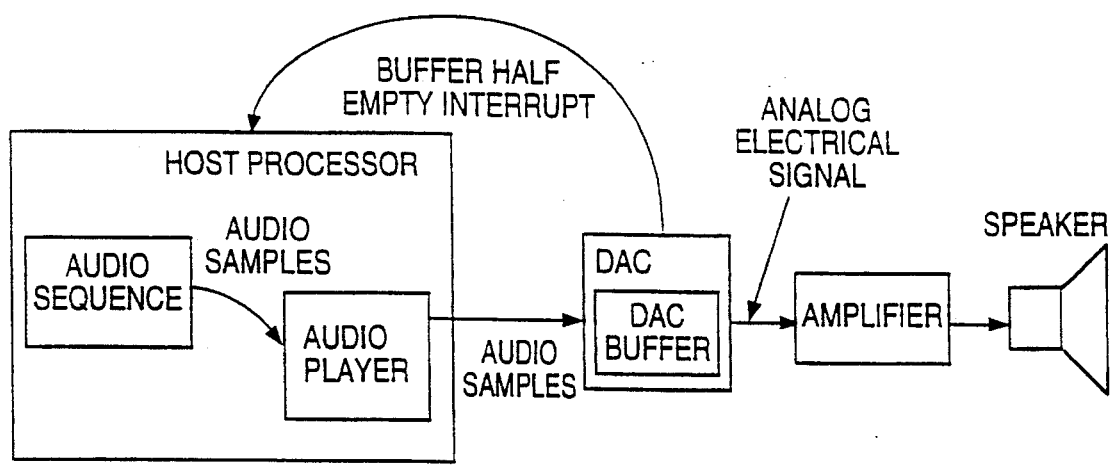
FIG. 25 is an illustration of an audio player in accordance with a preferred embodiment.

The read period is determined by a Digital to Analog Converter (DAC). A DAC converts digital audio samples to an analog electrical signal that can be converted to sound by an audio amplifier connected to a speaker. It converts N digital audio samples per second. N is called the sample rate of the DAC. The DAC has an internal buffer of audio samples awaiting conversion. The audio player, executing in the host processor, fills the DAC's buffer with samples read from an audio sequence. When this buffer is half empty, the DAC interrupts the host processor. The audio player then fills the buffer again with the next batch of audio samples read from the audio sequence. This process is illustrated in FIG. 25.

Figure 26:
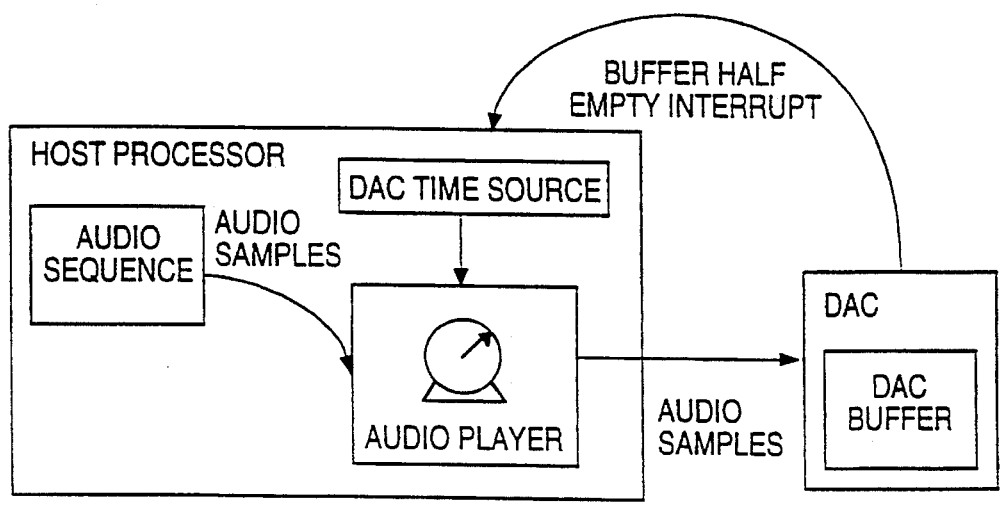
FIG. 26 is an illustration of an audio player as a master in accordance with a preferred embodiment.

An illustration of an audio player as a Master is presented in FIG. 26. The Audio Player has a clock that can act as a master to another clock. This is accomplished by insuring that the audio player's clock always reflect the time of the sample currently being reproduced by the speaker. For example, if at a point T in time the 88200th sample from the beginning of the audio sequence is being played on the speaker, and the sample rate of the DAC and audio sequence are both 44,100 samples per second, then the audio player's clock must be at time 2 seconds. This is accomplished by creating a time source which is driven by the DAC. Every time the DAC outputs a buffer full of samples, it interrupts the host processor. The host processor will then increment the time source's current time by a time equivalent to the amount of samples converted since the last interrupt. This is determined by:

<increment time>=<samples since last interrupt>/<DAC sample rate>

The Audio Player synchronizes its software clock to the DAC time source. The linear function obeys the following formula.

$$t_{audioplayerclock}=1 \cdot t_{DAC} \text{ time source}+b$$

where b is set so that when playback of the sequence starts, taudioplayerclock=0. This is accomplished using the SetTime function of the clock.

Audio Player as Slave

The audio player can synchronize to an external clock. In this case, the audio player must insure that the sample being reproduced by the speaker corresponds to the current time of the external clock. For example, if at a given instant in time the external clock object's current time is two seconds, then the 88,200th sample in the audio sequence should at that instant be reproduced by the speaker, assuming a 44,100 sample rate for the audio sequence. This processing is accomplished as follows. The audio player waits for an interrupt from the DAC, indicating that more audio data is needed. The player then examines the current time of its clock, determining if it needs to speed up or slow down the playback rate or jump to a new position in the audio sequence in order to insure that the correct samples are being played from the speaker. It then uses a digital signal processing algorithm to convert the rate of the audio sequence samples to the sample rate of the DAC before outputting the samples.

Figure 27:
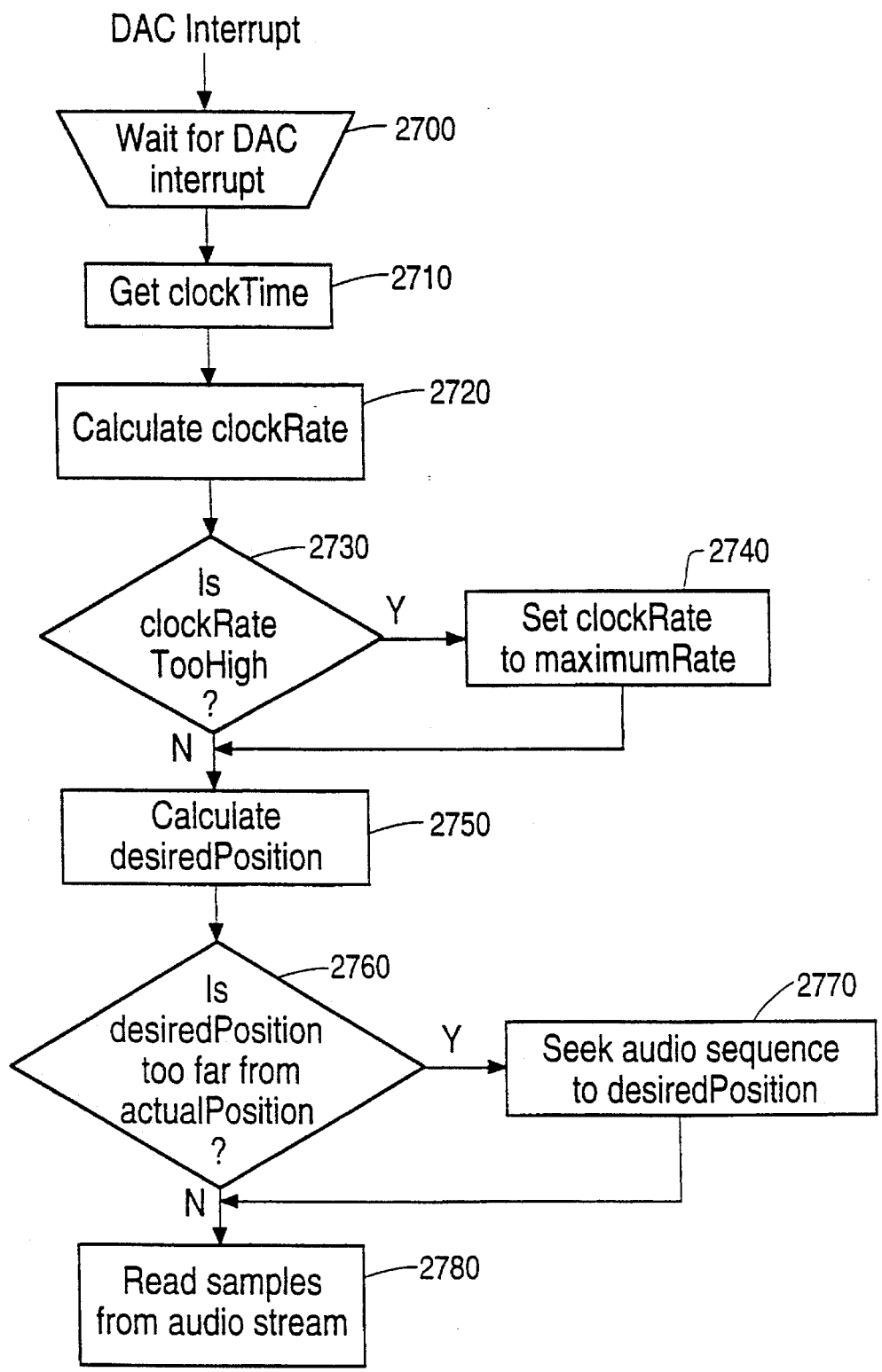
FIG. 27 is a flowchart illustrating an audio player slaving to a clock in accordance with a preferred embodiment.

The detailed logic associated with slaving an audio player is presented in FIG. 27 in accordance with a preferred embodiment. Processing commences at 2700 where a wait state is entered until a DAC interrupt occurs. When a DAC interrupt occurs, control passes to function block 2710 where the clock time is obtained. Then, at function block 2720 the clock rate is calculated relative to the DAC rate, and a test is performed at 2730 to determine if the clockRate is too high. If so, then the clock rate is set to the maximum rate. If not, then the desired position is calculated at function block 2750. Function block 2750 requires more explanation because its processing is more involved. That is the calculation of the desired position of the audio stream. This position determines the next sample that the player will output. The calculation of this value is nontrivial because of the delay introduced by the DAC. When the player outputs a sample to the DAC, it enters the DAC's internal buffer. The sample is not reproduced at the speaker until all of the samples already in the DAC's buffer are emptied. Fortunately, this delay can be calculated. It is:

$$\text{delay}_{DAC} = <\text{samples in internal bufferDAC}> / \text{sampleRate}_{DAC}$$

The audio sequence samples will be output at a rate determined by clockRate. This is the derivative of the external clock position relative to the DAC clock position. To determine the desired position, the DAC delay is subtracted, but before doing so it must be converted to the time base of the audio stream. This is done as follows:

$$\text{delay}_{audio\ sequence} = (\text{delay}_{DAC} \cdot \text{clockRate})$$

The desired position of the audio stream is then calculated as follows:

$$\text{desiredPosition} = <\text{position of next sample in sequence}> - \text{delayaudio sequence}$$

Then, at decision block 2760, the desired position is compared to the actual position to determine if it is too far from the actual position. If so, then the audio sequence is sought to the desired position at function block 2770. In any case, then the samples are read from the audio stream, converted to clock rate, and written to the output buffer at function block 2780.

Graphic Player Implementation

Figure 28:
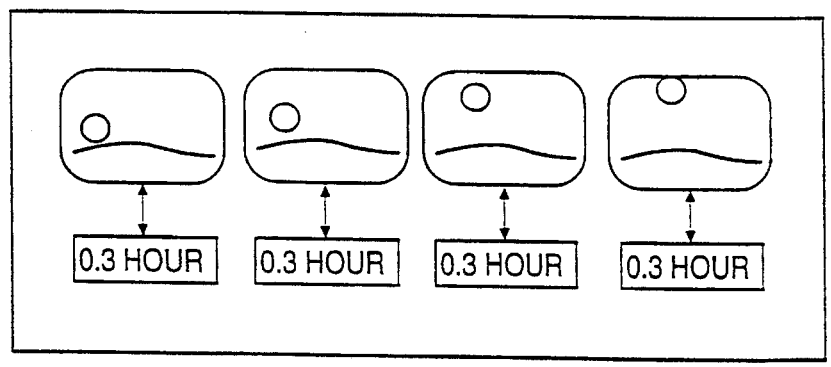
FIG. 28 is an illustration of a sequence of images of a sunrise in accordance with a preferred embodiment.

A graphic sequence object is a collection of graphic objects. The graphic objects in a graphic sequence may be digitized video frames, rendered frames of an animation, or any other graphic objects related by time. A graphic sequence has member functions that access individual graphics for storage and retrieval. Each graphic has a duration; therefore, the sequence has a duration that is the summation of the duration of the component graphic objects. A graphic sequence also provides a member function that maps a time within the duration of the sequence to a particular graphic objects. An example of a sequence of images of a sunrise is presented in FIG. 28 with the duration of each graphic object presented below the frame.

A graphic player plays a graphic sequence through its graphic output port, which may be connected to a graphic input port. The player has a software clock that may drive other clocks (as a master) or be driven (as a slave). The player sequences through the graphic objects in a graphic sequence in accordance with the time on its clock. The clock is limited to a range from time zero to a time equal to the duration of the graphic sequence being played. The player delays until the duration of the current frame has elapsed on the clock. The player then checks the current time on the clock, gets the graphic objects in the sequence that maps to that time, and writes the graphic objects to the output port.

Figure 29:
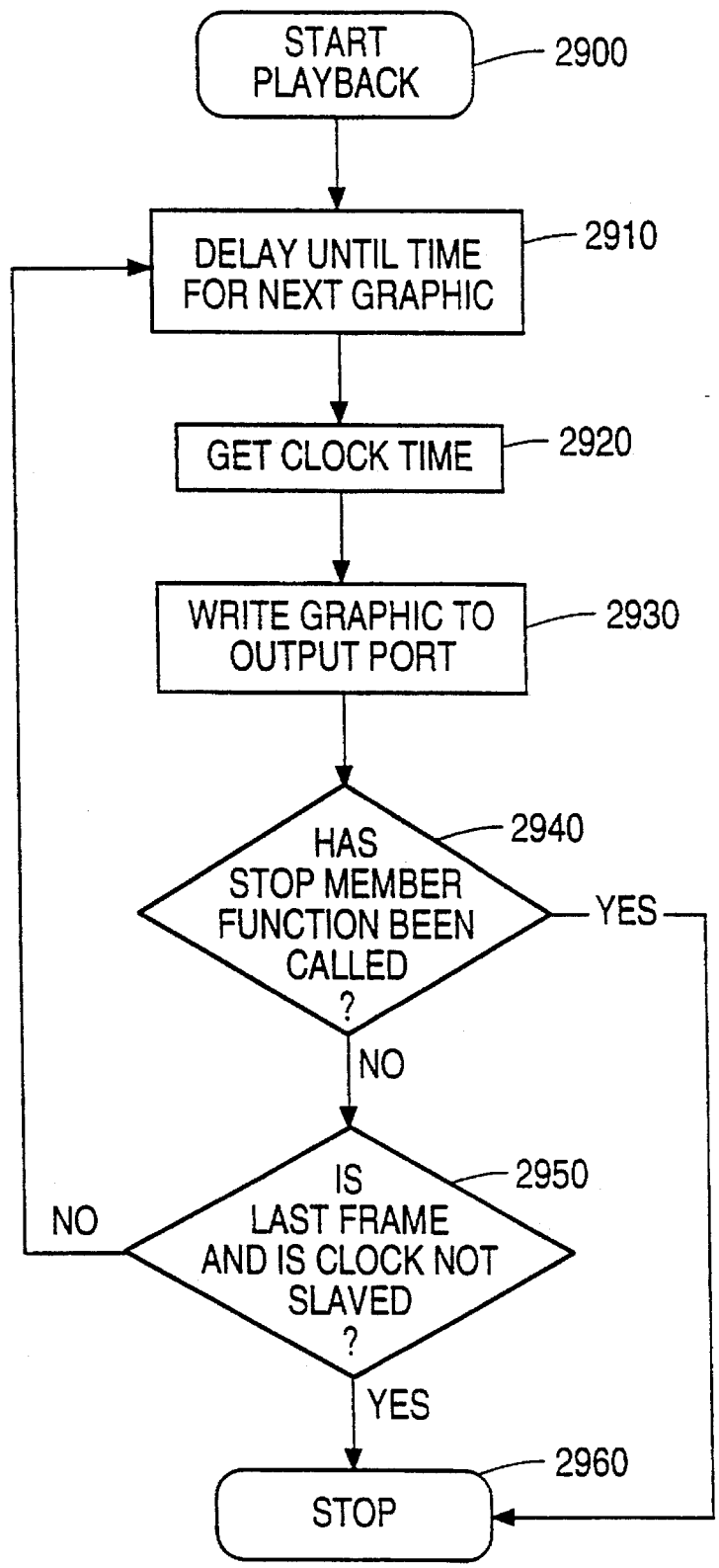
FIG. 29 is a flowchart setting forth the logic associated with a graphic player in accordance with a preferred embodiment.

The player always uses the current time on the clock when selecting the graphic objects to be written to the output port. This provides automatic degradation if performance is slow: if writing a graphic object takes longer than its s duration, one or more frames is effectively skipped. Changes in the clock's direction are similarly accounted for. The detailed logic associated with the graphic player is presented via a flowchart in FIG. 29. Processing commences at terminal 2900 and immediately flows to function block 2910 to enter a delay until time for the next graphic object. Then, after the delay, the clock time is obtained at function block 2920, the graphic object is written to an output port at function block 2930, and a test is performed at decision block 2940 to determine if the stop member function has been called. If so, then processing is terminated at terminal 2960. If not, then a test is performed at decision block 2950 to determine if the last frame and the clock are not slaved. If not, then control passes to function block 2910. If so, then processing is terminated at terminal 2960.

Note that if the player's clock is synchronized to another clock, then the display loop continues to execute until the player is explicitly stopped. However, if the clock is not synchronized, the loop exits when the last graphic in the sequence is written.

MIDI PLAYER IMPLEMENTATION

Figure 30:
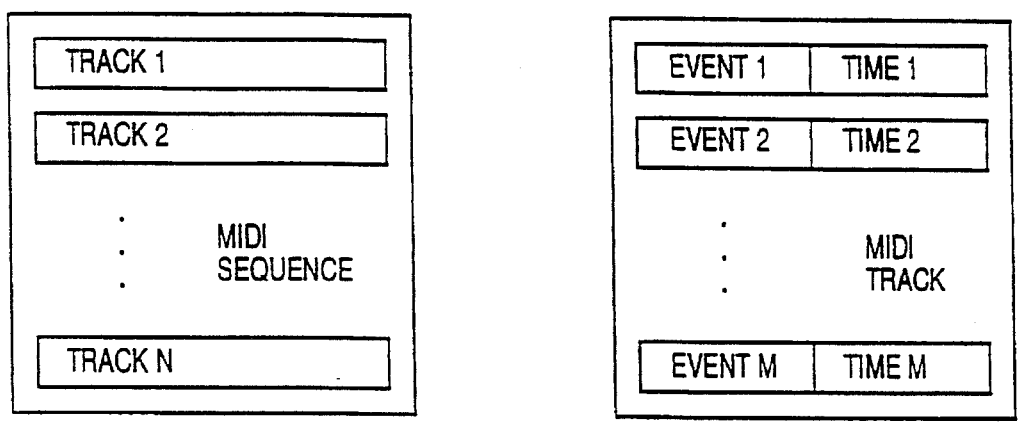
FIG. 30 is an illustration of a MIDI sequence and a MIDI Track format in accordance with a preferred embodiment.

A midi sequence object is a collection of MIDI events. Its member functions control playback and access time-ordered tracks of MIDI events. A MIDI Sequence and MIDI Track format is presented in FIG. 30.

Figure 31:
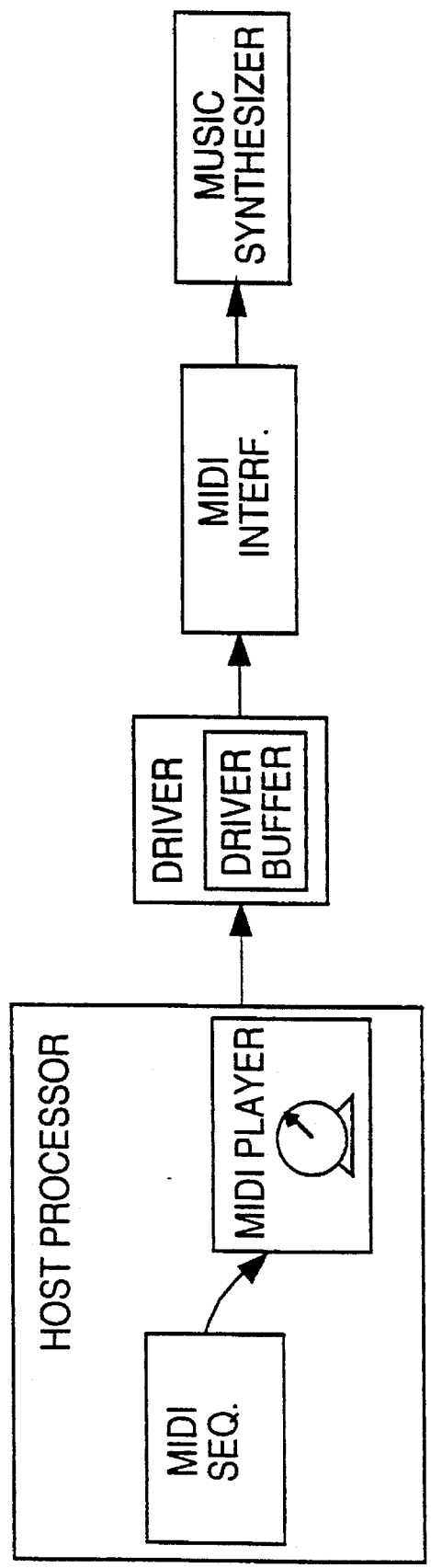
FIG. 31 is an illustration of a MIDI player playing a sequence through a driver in accordance with a preferred embodiment.

A midi player plays a midi sequence through its output port, which may be connected to any input port, including that of a MIDI driver for eventual output on a MIDI synthesizer. The player follows it software clock to output events as they become current. The processing performs well with both forward and backward flow of time and takes into account degradation policy should the host processor fall behind. FIG. 31 is an illustration of a MIDI Player playing a sequence through a driver to a synthesizer The MIDI player can serve either as a slave or master or both in a synchronization relationship, by using the SyncTo and SyncToSelf member functions inherited from its base class, Time-Based Media Player. The implementation details do not change, and follow a simple time-ordered event loop with two special cases. The first special case handles time switching direction. Normally the player proceeds by delaying until the next event becomes current. After the delay ends, the player checks the time to determine if a special case has occurred. The first special case arises when the delay is early. This is represented by the first decision point in the main loop of the flowchart below. When detected, the player will switch direction, so that "next" becomes the opposite of what it was. The second special case concerns processor overload. When the host processor can no longer keep up, a degradation policy is applied. The player stops when the end of the sequence is reached, either at the last event in the forward case or at the first event in the backward case.

Figure 32:
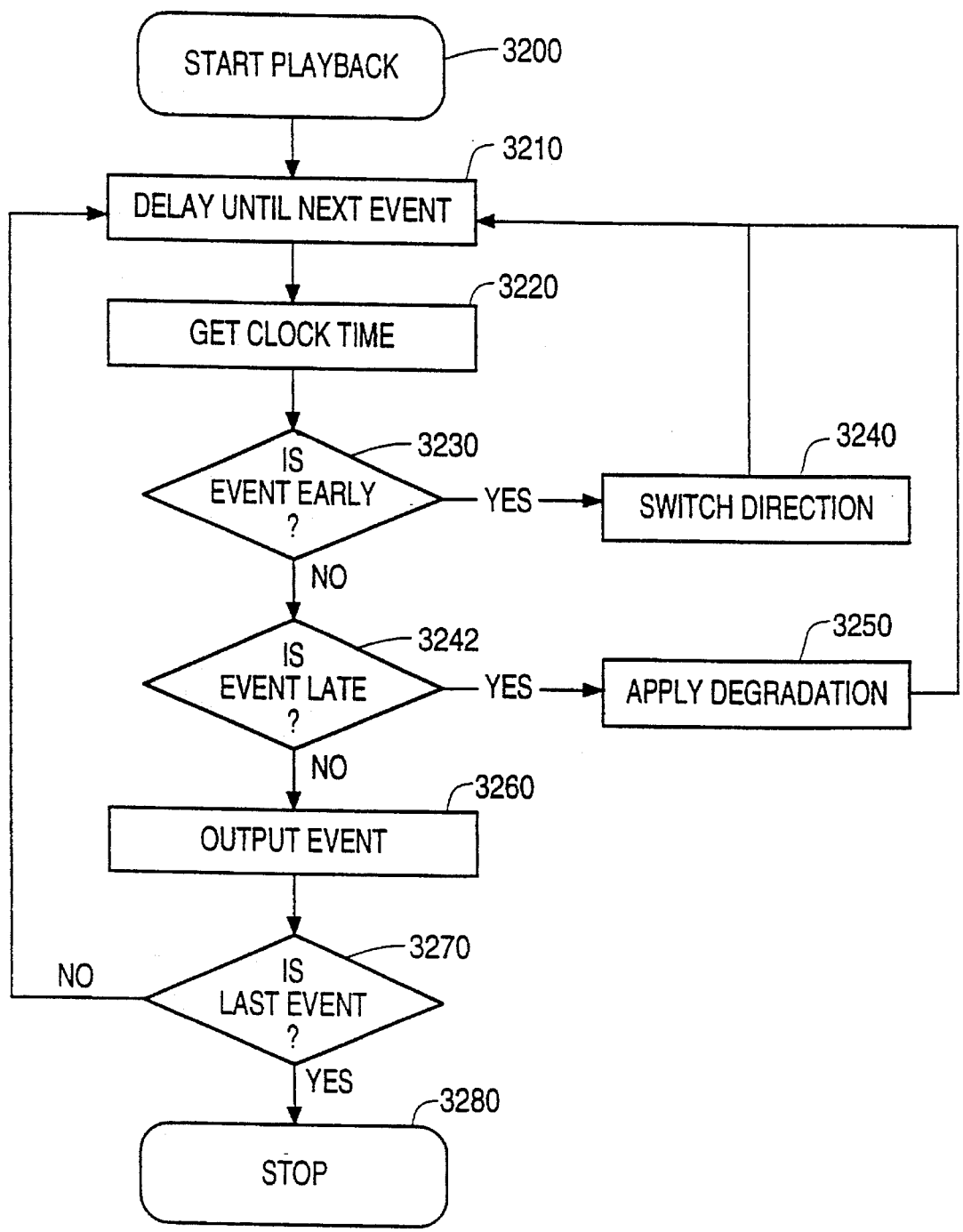
FIG. 32 is a flowchart setting forth the detailed logic of a MIDI player in accordance with a preferred embodiment.

A flowchart of the MIDI Player detailed logic is presented in FIG. 32. Processing commences at terminal 3200 and immediately passes to function block 3210 to enter a delay until the next MIDI event. When the next MIDI event is ready to execute, then the clock time is obtained at function block 3220, and a test is performed at decision block 3230 to determine if the event is early. If so, then the direction is switched and control is passed to function block 3210. If not, then another test is performed at decision block 3242 to determine if the event is late. If the event is late, then degradation is applied to catch up, and control is passed back to function block 3210. If the event is not late, then the event is output at function block 3260, and a test is performed at decision block 3270 to determine if the last event has been performed and the clock object is not slaved. If the last event has been performed and the clock is not slaved, then processing is terminated at terminal 3280. If there are more events, then control is passed to function block 3210 to process the next event.

Display Screens

Figure 33:
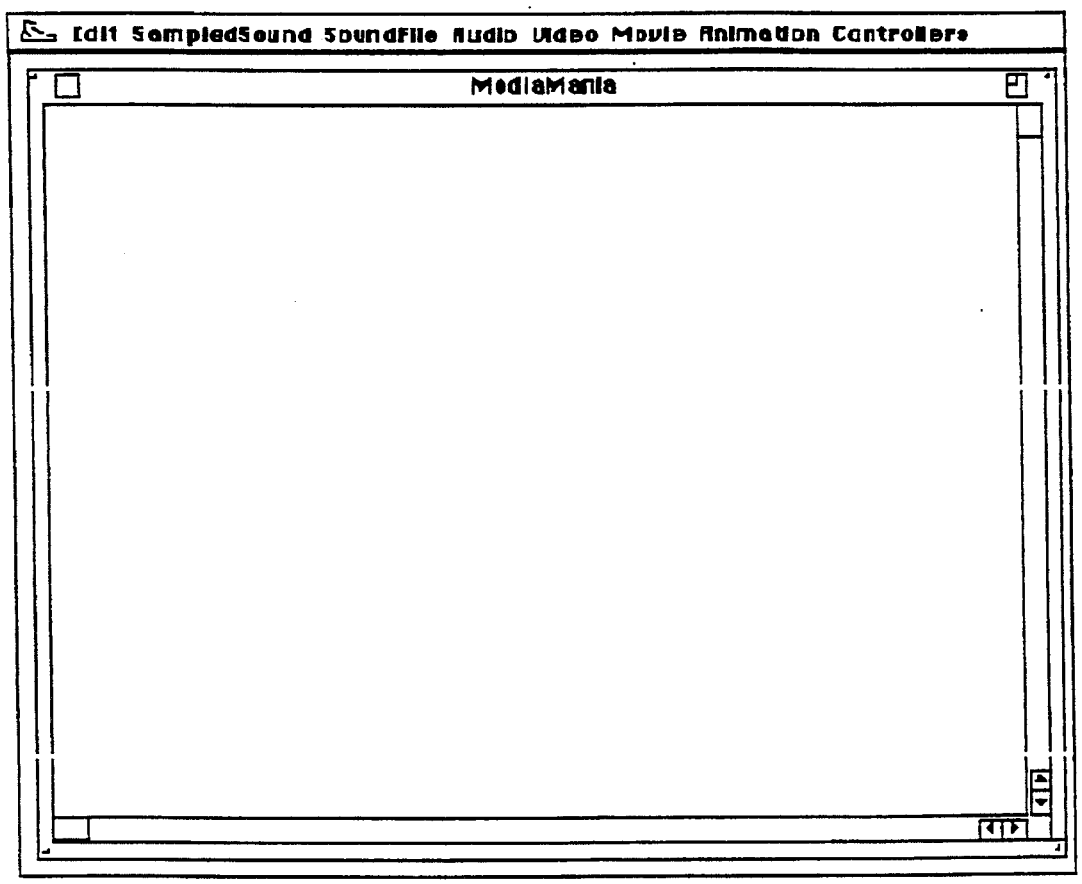
FIG. 33 is an illustration of an empty desktop display in accordance with a preferred embodiment.
Figure 34:
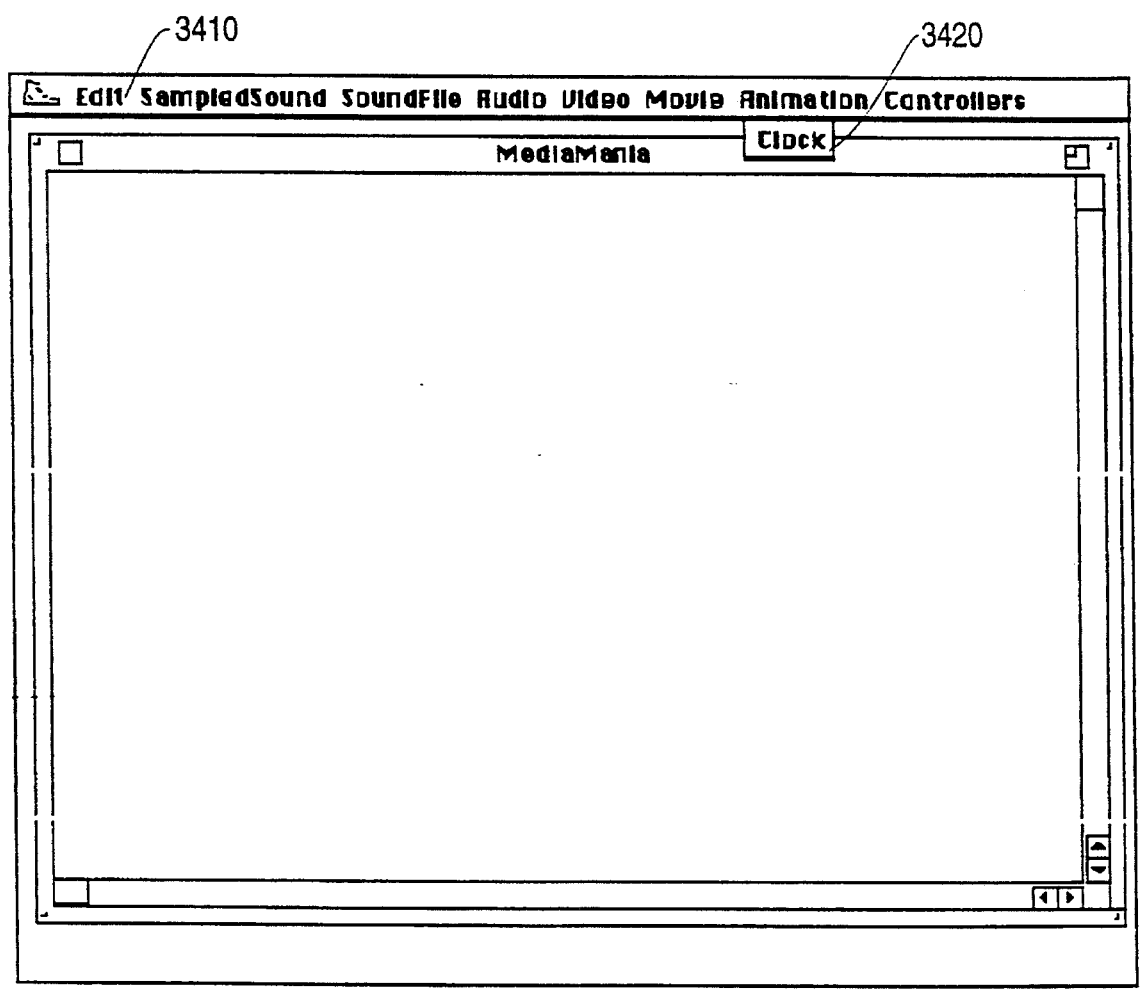
FIG. 34 is an illustration of a selected clock object definition display in accordance with a preferred embodiment.
Figure 35:
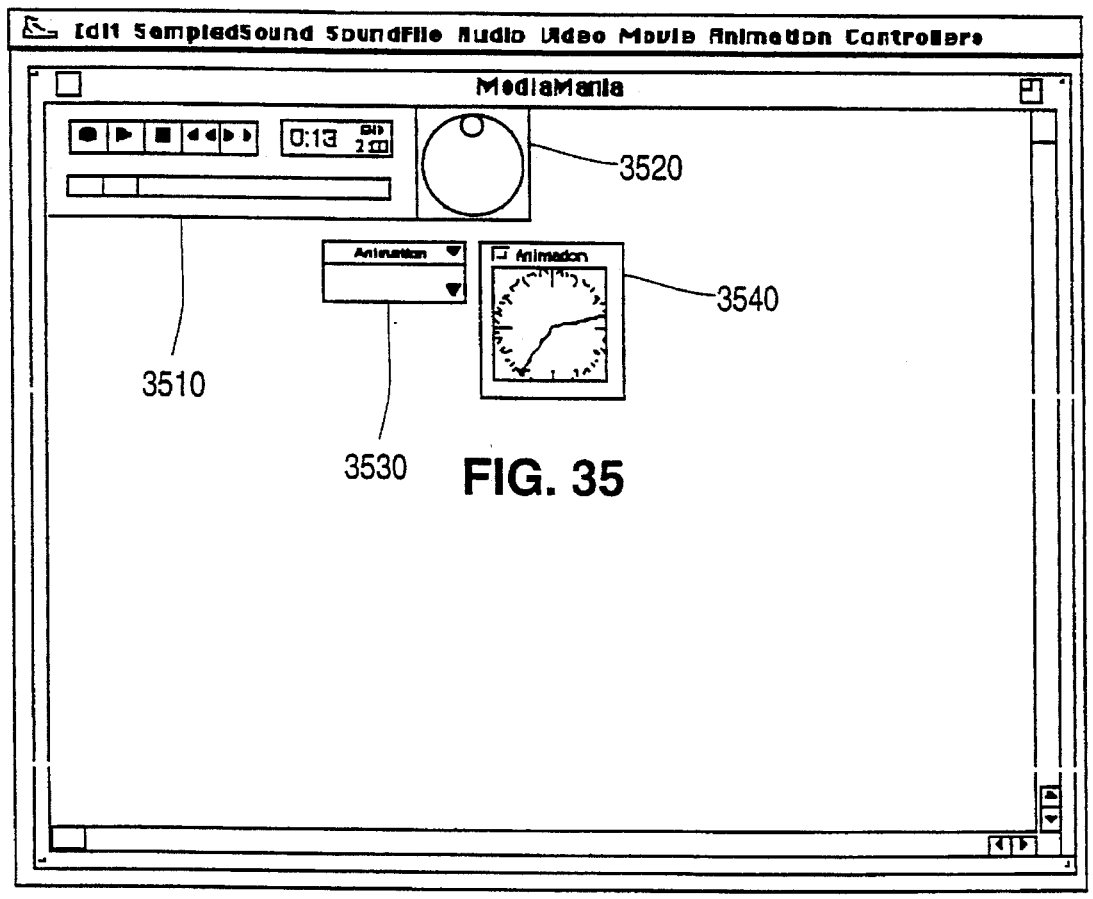
FIG. 35 is an illustration of various clock objects and multimedia objects in accordance with a preferred embodiment.

FIGS. 33 to 37, are illustrations of displays in accordance with a preferred embodiment. FIG. 33 is an illustration of an empty desktop display that a user is presented with to commence the definition of a software clock and synchronize the same with a multimedia object. FIG. 34 is an illustration of a selected clock object definition display in accordance with a preferred embodiment. A user selects the clock object definition from menu bar of information 3410. In particular, the clock menu item 3420 is selected using a mouse as shown in FIG. 1 and a pull down menu as shown in FIG. 3420. FIG. 35 is an illustration of various clock objects and multimedia objects, defined using the menu selection described in FIG. 34, in accordance with a preferred embodiment. A slider bar object 3510, Jog/Shuttle controller 3520, clock object 3530, and an animation multimedia object 3540 are all shown as they would appear in an actual multimedia presentation.

Figure 36:
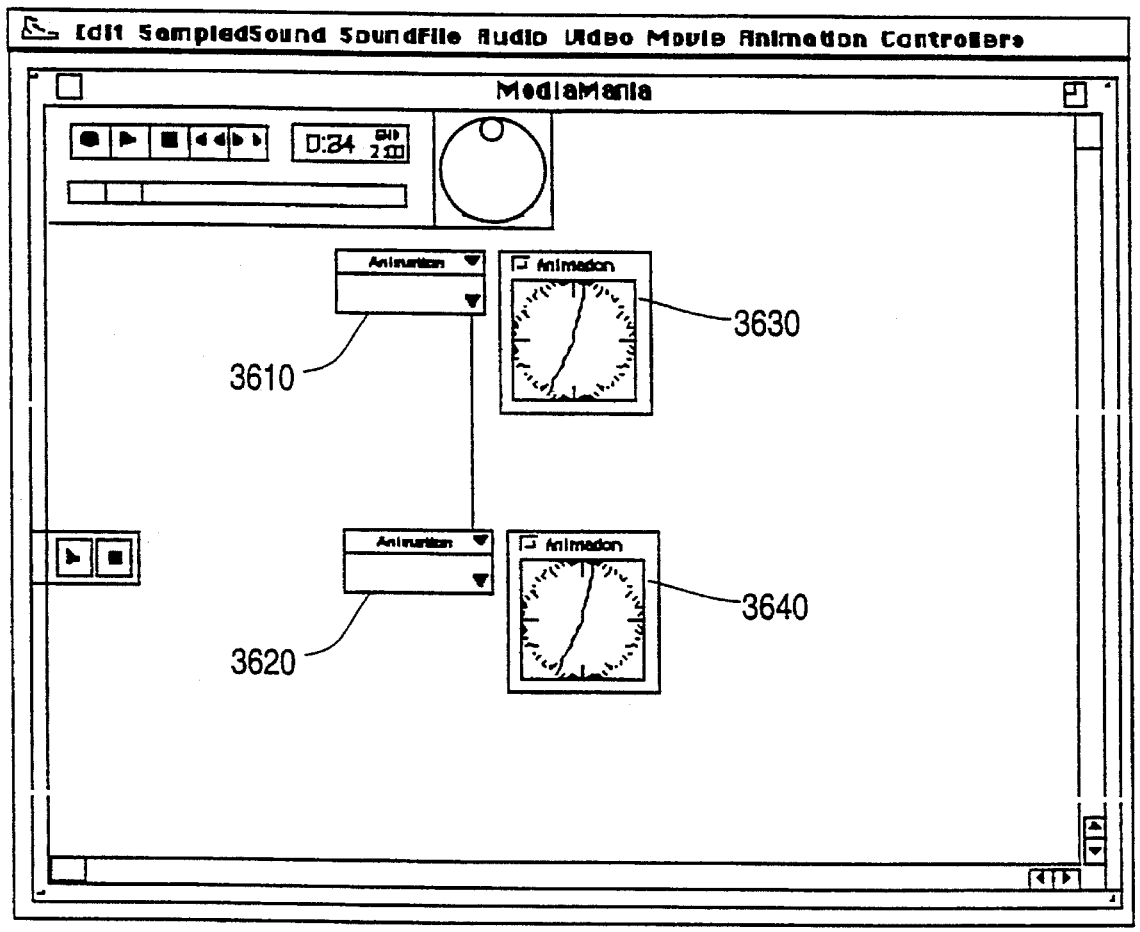
FIG. 36 is an illustration of various clock objects linked together and multimedia objects in accordance with a preferred embodiment.
Figure 37:
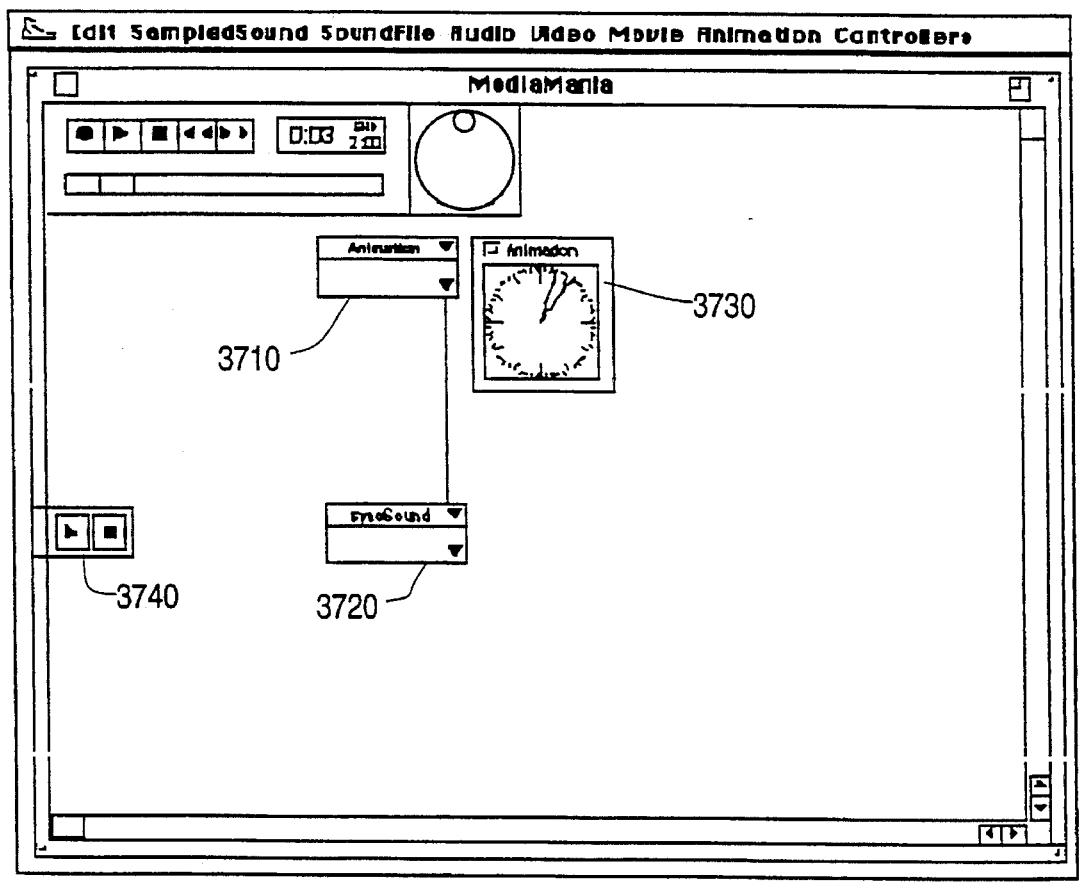
FIG. 37 is an illustration of a visual object synchronized with an audio object in accordance with a preferred embodiment.

FIG. 36 is an illustration of various clock objects linked together and multimedia objects in accordance with a preferred embodiment. The linkages are created using a cursor to rubber band a geometric figure, such as a line segment, to join up a clock object 3610 to another clock object 3620, or multimedia objects 3630 and 3640. FIG. 37 is an illustration of a visual object synchronized with an audio object in accordance with a preferred embodiment. The visual clock object 3710 is synchronized with the audio clock object 3720 to control the associated multimedia presentation of music and displays represented by the animation multimedia object 3730.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A computer system for synchronizing multimedia presentations generated by a time-based MIDI media sequence and by another time-based media sequence in response to a synchronization request specifying a new clock rate of presentation of the MIDI media sequence, the system comprising:

(a) a storage;

(b) a display;

(c) means for providing a master time signal;

(d) a clock object for providing an associated current time value, the clock object residing in the storage and including
means for displaying representative indicia of the clock object on the display, and
current time means for computing the associated current time value according to a clock function of the master time signal, an original clock rate value and an original offset value;

(e) a multimedia player object resident in the storage, including
means for displaying representative indicia of the player object on the display, and means, responsive to the current time
value of the clock object, for presenting the other time-based media sequence;

(f) a musical instrument digital interface player object resident in the storage, cooperating with the clock object, and including
means for displaying representative indicia of the musical instrument digital interface player object on the display, and
means, responsive to the current time value of the clock object, for presenting the time-based MIDI media sequence;

(g) clock object synchronization means, responsive to the synchronization request, for synchronizing the clock object, including
means for computing a new offset value according to a new function of the master time signal, the new clock rate, the original clock rate, and the original offset value, and
means for replacing the original clock rate value and the original clock offset value of the clock object with the new clock rate and the new offset rate, respectively, so that the MIDI media sequence may be presented at the new clock rate while keeping the current time value unchanged at the instant of synchronization.

2. The system as recited in claim 1, including means, responsive to an iconic operation, for connecting the representative indicia of the clock object with the representative indicia of the multimedia player object and with the representative indicia of the musical instrument digital interface player object, and further including means, cooperating with the connecting means, for providing the current time value of the clock object to the multimedia player object and to the musical instrument digital interface player object so that they may respond to the current time value.

3. The system as recited in claim 1, including means for adjusting the clock rate value.

4. The system as recited in claim 1, including external means for obtaining the current time value.

5. The system as recited in claim 1, including a plurality of external time sources for obtaining the current time value.

6. The system as recited in claim 1, including means for forcing the current time value to decrease by using a negative clock rate value.

7. The system as recited in claim 2, wherein the connecting means includes means for displaying a geometric figure linking the representative indicia of the clock object to the representative indicia of the multimedia player object on the display.

8. The system as recited in claim 7, wherein the geometric figure is a line segment.

9. A method of synchronizing multimedia presentations generated by a time-based MIDI media sequence and another time-based media sequence in response to a synchronization request specifying a new clock rate of presentation of the MIDI media sequence on a computer having a storage, a mechanism for providing a master time signal, and a display, the method comprising the steps of:

(a) creating a clock object in the storage, the clock object having a mechanism for computing an associated current time value according to a clock function of the master time signal, an original clock rate value and an original offset value;

(b) displaying a representative indicia of the clock object on the display;

(c) creating a multimedia player object in the storage, the multimedia player object having a mechanism for presenting the other time based media sequence in response to the current time value of the clock object;

(d) displaying a representative indicia of the multimedia player object on the display;

(e) creating a musical instrument digital interface player object in the storage, the musical instrument digital interface player object having a mechanism for presenting the MIDI media sequence in response to the current time value of the clock object; and (f) displaying a representative indicia of the musical instrument digital interface player object on the display (g) in response to the synchronization request, computing a new offset value according to a new clock function of the master time signal, the new clock rate, the original clock rate, and the original offset value (h) replacing the original clock rate value and the original clock offset value of the clock object with the new clock rate and the new offset value, respectively, so that the MIDI media sequence may be presented at the new clock rate while keeping the current time value unchanged at the instant of synchronization.

10. The method as recited in claim 14, including the steps of (l) connecting the representative indicia of the clock object with the representative indicia of the multimedia player object and with the representative indicia of the musical instrument digital interface player object; and (j) in response to step (i), providing the current time value of the clock object to the multimedia player object and to the musical instrument digital interface player object so that they may respond to the current time value.

11. The method as recited in claim 9, including the step of (l) adjusting the clock rate value.

12. The method as recited in claim 9, including the step of (k) obtaining the current time value from an external device.

13. The method as recited in claim 9, including the step of (l) querying a plurality of external time sources for obtaining the current time value.

14. The method as recited in claim 9, including the step of (m) forcing the current time value to decrease by using a negative clock rate value.

15. The method as recited in claim 10, wherein connecting step (l) includes the step of (l.1) displaying a geometric figure linking the representative indicia of the clock object to the representative indicia of the multimedia player object on the display.

16. The method as recited in claim 15, wherein the geometric figure is a line segment.

* * * * *